(12) United States Patent
Cohn et al.

(10) Patent No.: US 9,842,207 B2
(45) Date of Patent: *Dec. 12, 2017

(54) MOBILE DEVICE WITH MULTIPLE SECURITY DOMAINS

(71) Applicant: INTERNATIONAL BUSINESS MACHINES CORPORATION, Armonk, NY (US)

(72) Inventors: David L. Cohn, Hawthorne, NY (US); Guerney D. H. Hunt, Yorktown Heights, NY (US); James Randal Moulic, Anchorage, AK (US); Dimitrios Pendarakis, Westport, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/874,441

(22) Filed: Oct. 4, 2015

(65) Prior Publication Data

US 2016/0026790 A1    Jan. 28, 2016

Related U.S. Application Data

(63) Continuation of application No. 13/667,130, filed on Nov. 2, 2012, now Pat. No. 9,152,223, which is a
(Continued)

(51) Int. Cl.
*G06F 11/20*   (2006.01)
*G06F 21/53*   (2013.01)
(Continued)

(52) U.S. Cl.
CPC ............... *G06F 21/53* (2013.01); *G06F 3/01* (2013.01); *G06F 3/0484* (2013.01); *G06F 9/468* (2013.01);
(Continued)

(58) Field of Classification Search
CPC .......... G06F 9/5083; G06F 9/48; G06F 9/468; G06F 9/4403; G06F 9/3863;
(Continued)

(56) References Cited

U.S. PATENT DOCUMENTS 4,484,270 A * 11/1984 Quernemoen .......... G06F 9/468
710/37
7,450,959 B2   11/2008 Lin
(Continued)

FOREIGN PATENT DOCUMENTS

WO    WO2010/017098    2/2010

OTHER PUBLICATIONS

Gregory D. Abowd, et al "Context-Aware Computing". PERVASIVEcomputing, Jul.-Sep. 2002, pp. 22-23.
(Continued)

*Primary Examiner* — Le H Luu
(74) *Attorney, Agent, or Firm* — Louis J. Percello; Otterstedt, Ellenbogen & Kammer, LLP

(57) ABSTRACT

Included within a shared housing are at least one user interface element; a first isolated computational entity; a second isolated computational entity; and a switching arrangement. The switching arrangement is configured to, in a first mode, connect the first isolated computational entity to the at least one user interface element; and, in a second mode, connect the second isolated computational entity to the at least one user interface element.

5 Claims, 12 Drawing Sheets

Related U.S. Application Data continuation-in-part of application No. 13/408,170, filed on Feb. 29, 2012, now Pat. No. 8,850,557.

(60) Provisional application No. 61/611,352, filed on Mar. 15, 2012, provisional application No. 61/596,492, filed on Feb. 8, 2012, provisional application No. 61/555,673, filed on Nov. 4, 2011.

(51) Int. Cl.

| | | |
|---|---|---|
| *G06F 9/46* | (2006.01) | |
| *G06F 15/173* | (2006.01) | |
| *G06F 15/78* | (2006.01) | |
| *G06F 3/01* | (2006.01) | |
| *H04W 12/08* | (2009.01) | |
| *G06F 3/0484* | (2013.01) | |

(52) U.S. Cl.
CPC ............ *G06F 11/20* (2013.01); *G06F 11/201* (2013.01); *G06F 11/2005* (2013.01); *G06F 11/2033* (2013.01); *G06F 11/2089* (2013.01); *G06F 15/173* (2013.01); *G06F 15/7871* (2013.01); *H04W 12/08* (2013.01); *G06F 2221/034* (2013.01)

(58) Field of Classification Search
CPC .... G06F 9/3004; G06F 9/30032; G06F 11/20; G06F 11/2005; G06F 11/201; G06F 11/2089; G06F 11/2033; G06F 15/173; G06F 15/7871; G06F 21/53; G06F 12/0817

See application file for complete search history.

(56) References Cited

U.S. PATENT DOCUMENTS

| | | | | |
|---|---|---|---|---|
| 7,805,706 | B1* | 9/2010 | Ly | G06F 9/5083 709/221 |
| 8,850,557 | B2 | 9/2014 | Boivie et al. | |
| 2003/0225891 | A1 | 12/2003 | Stienhans | |
| 2004/0196316 | A1 | 10/2004 | Handy Bosma | |
| 2005/0240983 | A1 | 10/2005 | Peters | |
| 2006/0053246 | A1* | 3/2006 | Lee | G06F 9/4403 711/100 |
| 2007/0036348 | A1 | 2/2007 | Orr | |
| 2007/0066275 | A1 | 3/2007 | Nagy | |
| 2007/0077964 | A1 | 4/2007 | Llanos | |
| 2008/0229085 | A1* | 9/2008 | Cornwell | G06F 9/30032 713/1 |
| 2008/0242384 | A1 | 10/2008 | Hsu | |
| 2008/0259094 | A1 | 10/2008 | Kim | |
| 2010/0005531 | A1* | 1/2010 | Largman | G06F 21/53 726/24 |
| 2010/0011007 | A1 | 1/2010 | Bettger et al. | |
| 2010/0180014 | A1 | 7/2010 | Kannan | |
| 2011/0145833 | A1 | 6/2011 | De Los Reyes | |
| 2011/0239166 | A1 | 9/2011 | Choi | |
| 2011/0242035 | A1 | 10/2011 | Nozawa | |
| 2012/0227045 | A1* | 9/2012 | Knauth | G06F 9/3863 718/100 |
| 2013/0091328 | A1* | 4/2013 | Yoshihara | G06F 12/0817 711/118 |
| 2013/0227704 | A1 | 8/2013 | Boivie et al. | |
| 2014/0059333 | A1* | 2/2014 | Dixon | G06F 9/3004 712/244 |
| 2014/0122844 | A1* | 5/2014 | Swanberg | G06F 9/3012 712/228 |

OTHER PUBLICATIONS

Galen M. Gillman, "Business smartphone, personal smartphone: One device". Published on InfoWorld (http://www.infoworld.com) on Feb. 28, 2012, pp. 1-4.

W. Eric Hall, et al. IBM Research Report, "HWMAC: Hardware-Enforced Fine_Grained Policy-Driven Security" Feb. 21, 2011, IBM T.J. Watson Research Center, pp. 1-23 plus cover.

Authorized Officer Blaine R. Copenheaver, USPTO as ISA, International Search report and Written Opinion, PCT/US2012/063144, dated Jan. 25, 2013, pp. 1-11.

Wikipedia, Hypervisor, downloaded from https://en.wikipedia.org/wiki/Hypervisor, Mar. 12, 2012, pp. 1-7.

Wikipedia, Xen, downloaded from https://en.wikipedia.org/wiki/Xen, Mar. 12, 2012, pp. 1-10.

Wikipedia, VMware ESX, downloaded from https://en.wikipedia.org/wiki/VMware_ESX, Mar. 12, 2012, pp. 1-7.

Wikipedia, Arm Architecture, downloaded from https://en.wikipedia.org/wiki/ARM_architecture, Mar. 12, 2012, pp. 1-19.

ARM Inc., TrustZone: Why Trustzone, downloaded from http://www.arm.com/products/processors/technologies/trustzone.php, Mar. 15, 2012, pp. 1-4.

ARM Inc., TrustZone: Hardware Architecture, downloaded from http://www.arm.com/products/processors/technologies/trustzone.php, Mar. 15, 2012, pp. 1-4.

ARM Inc., TrustZone: Software Architecture, downloaded from http://www.arm.com/products/processors/technologies/trustzone.php, Mar. 15, 2012, pp. 1-4.

ARM Inc., TrustZone: System Architecture, downloaded from http://www.arm.com/products/processors/technologies/trustzone.php, Mar. 15, 2012, pp. 1-4.

ARM Inc., TrustZone: System Components, downloaded from http://www.arm.com/products/processors/technologies/trustzone.php, Mar. 15, 2012, pp. 1-4.

State Intellectual Property Office of the People'S Republic of China, First Office Action in Chinese Application 201280053497.2, p. 1-5, English Translation p. 1-8, dated Feb. 3, 2016.

\* cited by examiner

MOBILE DEVICE WITH MULTIPLE SECURITY DOMAINS

CROSS-REFERENCE TO RELATED APPLICATIONS

This application is a continuation of U.S. patent application Ser. No. 13/667,130 filed Nov. 2, 2012, hereby expressly incorporated herein by reference in its entirety for all purposes, which application in turn:

claims the benefit of U.S. Provisional Application No. 61/555,673 filed on Nov. 4, 2011;

claims the benefit of U.S. Provisional Application No. 61/596,492 filed on Feb. 8, 2012, hereby expressly incorporated herein by reference in its entirety for all purposes;

claims the benefit of U.S. Provisional Application No. 61/611,352 filed on Mar. 15, 2012, which is also hereby expressly incorporated herein by reference in its entirety for all purposes;

is a continuation in part of U.S. patent application Ser. No. 13/408,170 filed Feb. 29, 2012, of Richard H. Boivie et al., entitled "A PROCESSOR AND DATA PROCESSING METHOD WITH NON-HIERARCHICAL COMPUTER SECURITY ENHANCEMENTS FOR CONTEXT STATES," which is further hereby expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to hand-held computing devices and the like.

BACKGROUND OF THE INVENTION

Individuals regularly interact with IT systems from multiple separate security domains. For example, someone who works for or is associated with a corporation or entity typically deals with an enterprise domain for work and with a non-enterprise domain for other matters. The integrity of each domain, i.e., its protection from unwanted external forces, must be managed through security, privacy and other defenses. Some domains, such as those for enterprises, assure integrity by limiting access to only trusted people and software. Today, the most widely accepted way to ensure the integrity of multiple domains is to use a separate physical device to access each domain. This could, for example, be a PC for the enterprise domain and a smart phone for the non-enterprise domain. In this case:

1. The PC and the IT systems in the enterprise domain have hardware and/or software security capabilities to authenticate, authorize and manage users; to assure that only qualified software is used; to protect and manage proprietary data on the PC, and to provide secure, encrypted communication for transmission of data between the host and the PC.
2. The smart phone used in the non-enterprise domain is a separate processing system that supports functions such as non-enterprise email, social media, Internet services, user-selected applications and games, photos, music and video content. Individuals are responsible for maintaining the security of their non-enterprise domain. Frequently the level of user-managed security is poor.

Some mobile devices, such as BLACKBERRY® devices (registered mark of Research In Motion Limited, 295 Phillip Street Waterloo, Ontario N2L 3W8 CANADA), iPhone® devices (registered mark of APPLE INC., 1 INFINITE LOOP CUPERTINO Calif. 95014) and ANDROID® phones (registered mark of Google Inc., 1600 Amphitheatre Parkway Mountain View Calif. 94043), support limited cross-domain operation. They permit access to specially designed applications (e.g. email) that run in one domain from a device that operates in a different domain. Such applications are designed to assure the integrity of the domains, typically by special code on both on the device and on a host computer.

SUMMARY OF THE INVENTION

Principles of the invention provide techniques for a mobile device with multiple security domains. In one aspect, an exemplary apparatus includes at least one user interface element; a first isolated computational entity; a second isolated computational entity; and a switching arrangement. The switching arrangement is configured to, in a first mode, connect the first isolated computational entity to the at least one user interface element; and, in a second mode, connect the second isolated computational entity to the at least one user interface element. Also included is a shared housing for the at least one user interface element, the first isolated computational entity, the second isolated computational entity, and the switching arrangement.

In another aspect, an exemplary method include providing an apparatus as just described, operating the apparatus in the first mode; and switching the apparatus from the first mode to the second mode.

In a further aspect, another exemplary apparatus includes a user interface element; at least one processor coupled to the user interface element and operative in one of: (i) a first personality with first personality data and one or more first personality programs associated therewith; and (ii) a second personality with second personality data and one or more second personality programs associated therewith. Also included is a switching arrangement, associated with the at least one processor, which causes the apparatus to switch between the first personality and the second personality. When the at least one processor is operative in the first personality, a user of the apparatus is unable to observe or affect operation of the one or more second personality programs and the second personality data. When the at least one processor is operative in the second personality, a user of the apparatus is unable to observe or affect operation of the one or more first personality programs and the first personality data.

In yet a further aspect, a kit of parts is provided for assembly into a mobile device having a housing, a first processor, and at least one user interface element. The kit of parts includes a second processor; an input/output controller configured to determine user intent; and a switching arrangement configured to, responsive to said input/output controller: in a first mode, connect the first processor to the at least one user interface element; and in a second mode, connect said second processor to the at least one user interface element.

In a still further aspect, a method of providing a service includes providing to a mobile device manufacturer a kit of parts of the kind just described, and providing support for a personality associated with said kit of parts, once assembled into said mobile device, to a user of said mobile device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:
- ability to have absolute difference between the underlying architecture of the different personalities, with respect to, for example, processor type, memory size, peripheral devices, and the like;
- easier to use software developed for a single personality device These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
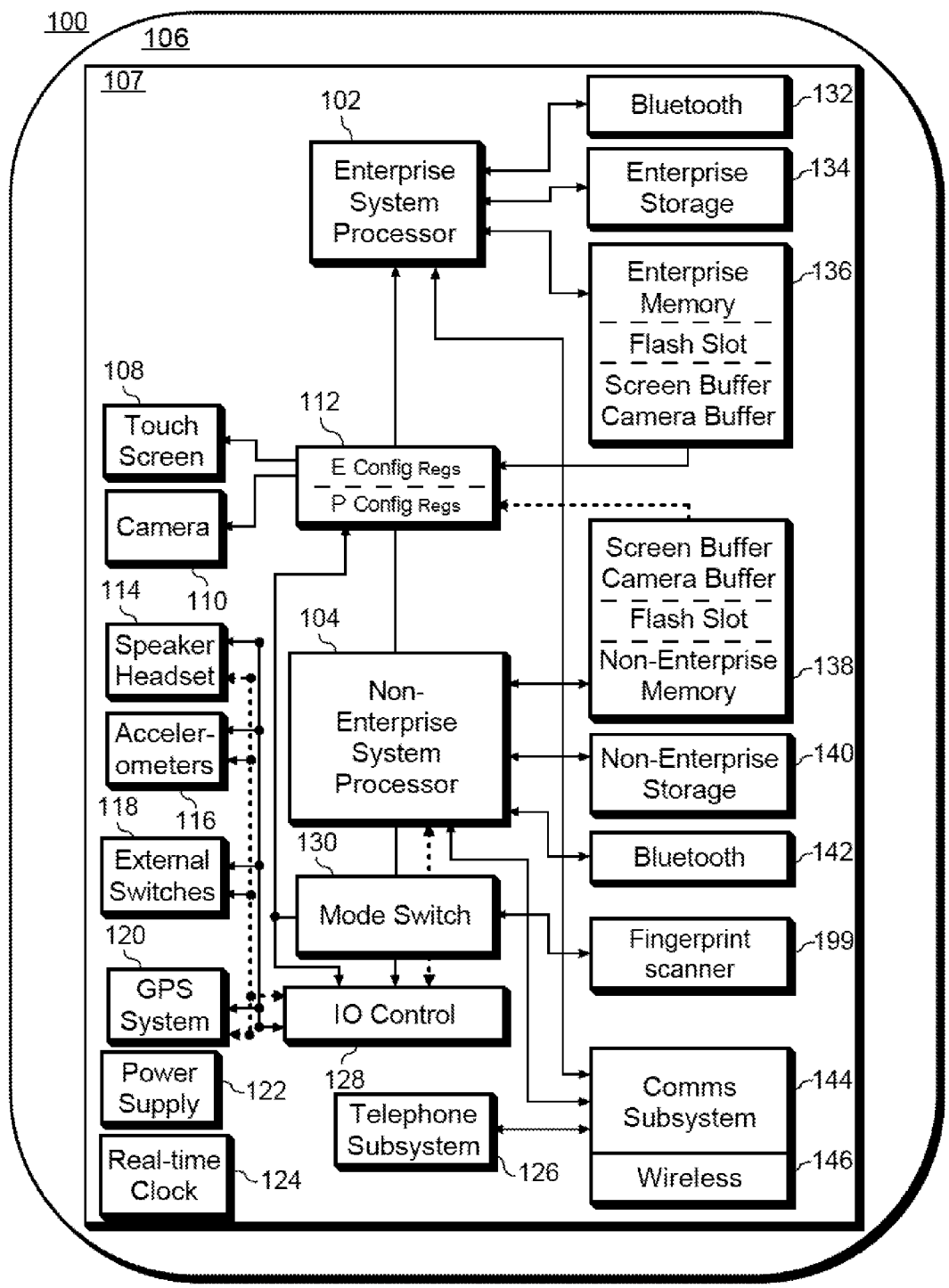
FIG. 1 shows a basic two-domain device, according to an aspect of the invention.

With today's technology and security threats, it has not been possible for a single physical device to operate in multiple domains while assuring appropriate, total isolation of those domains. If current device designs were used, hardware and software resources would be shared across domains. This sharing opens security exposures in the underlying hardware and OS platforms that malicious software could exploit to gain access to the device, to compromise security and to steal or corrupt data. Such software could, for example, hide a malware key logger in the controlling, common operating environment of a smart phone or PC. Using the privileged operations status it would then acquire, the logger could access shared, common hardware and operating system resources of supposedly isolated domains to capture password entries or other data. It could potentially gain direct access to active state-containing hardware registers or software-managed buffers.

One or more embodiments provide a system and method that allows a single physical device to simultaneously operate with complete freedom in each of several security domains while maintaining the separation and integrity of the domains. Such a device helps to assure the same level of integrity protection that is provided by using separate devices for each domain, such as the PC and smart phone mentioned above. Thus, for example, one or more embodiments allow someone who works for or is associated with a corporation or entity to download and run any non-enterprise application from any source without potentially compromising the security of enterprise operations with which the device might interact. The device allows the corporate information technology (IT) organization to specify and manage all of the software (from the hardware on up) used in the enterprise domain and permits someone who works for or is associated with a corporation or entity complete freedom to select all such software for the non-enterprise domain. Even stronger assurances are possible if the device also includes technologies for user authentication or the like (e.g., fingerprint recognition, speaker recognition, keyboard typing cadence, or other biometrics). In some instances, a confidence score can be developed based on one, some, or all of these user authentication procedures. A threshold value or values can be set. Such values can be used to determine what type of access is allowed and/or to require additional verification for some kinds of access (for example, answering a question such as mother's maiden name or the like; submitting to iris recognition; or the like). One or more embodiments are useful, for example, where an individual interacts with an enterprise domain and a non-enterprise domain; however, one or more embodiments are also applicable to more than two domains. Also, some embodiments provide a purely non-enterprise device with one domain for normal activities and a second domain reserved for sensitive matters involving, for example, financial and/or health care information. In this case, in some instances, the management and security of the sensitive domain could be provided as a service.

One or more embodiments are suitable for mobile devices where size, weight and convenience are significant differentiators. Indeed, a single mobile device that accommodates the security concerns of multiple domains is believed to offer particular utility. However, the same technology could be used in larger devices, such as laptop and desktop units.

In one or more embodiments, independent and isolated computing systems are packaged in a single mobile device and are used separately for each security domain. One or more embodiments advantageously reduce duplicate device resources. In one or more instances, the separate systems need not have consistent or compatible hardware and/or system software, and indeed, in one or more embodiments, the separate systems are physically prevented by hardware from accessing or observing each other.

A non-limiting exemplary embodiment will now be described for the common case with one Enterprise System and one Non-enterprise System. This embodiment 100 is shown in FIG. 1 and reference to this figure will be made in this section. A shared device package 106 and shared system board 107 are employed in the example. The hardware is designed so that no information can be passed directly between the systems through on-device interaction. To assure this, the device design meets the following criteria:

The processor of each system is used only for that system. The example embodiment 100 shown in FIG. 1 operates in two domains and has a separate processor for each domain. These are, respectively, the Enterprise System Processor 102 and Non-enterprise System Processor 104.

The data storage elements of each system are physically separate and used only for that system. This includes, for the enterprise system, as seen at 134, 136, processor memory, storage, IO buffers and optionally a slot for removable flash memory; and for the non-enterprise system, as seen at 138, 140, processor memory, storage, IO buffers and optionally a slot for removable flash memory.

Basic, information-independent support elements shared by all systems. These include elements such as the power supply 122, the real-time clock 124, telephone subsystem 126, communications subsystem 144, and wireless module 146.

Stateless IO hardware elements are shared, but are only accessible by the currently active system. Stateless IO (input/output, also referred to as I/O) elements do not maintain a record of their interaction with the systems and thus cannot transfer information between systems. They include speaker(s) and/or headset connector(s) 114, accelerometers 116, switches, GPS systems 120, and external switches 118.

A Mode Switch subsystem determines which system is the active system. As discussed below, there are various ways it can make this determination. In the non-limiting exemplary embodiment, the Mode Switch 130 uses an IO Control element 138 to allow only the active system to access the stateless IO hardware. The figure illustrates the Enterprise System as active with its IO links solid lines, and the Non-enterprise System inactive with dashed lines to the IO.

Some stateful IO hardware elements are also shared, but only those whose state information can be made specific to the active system. Stateful IO elements need access to historical information about, or the state of, their interaction with each system. For example, the screen 108 must have a record of the images it has been asked to display. For some such elements, this state information is held in a memory-mapped buffer and accessed from there by the stateful IO hardware element. The Mode Switch guarantees that the state information seen by the IO hardware will only be that created by its interaction with the active system. It does this by controlling which set of Configuration Registers 112 is available to the IO hardware. In the exemplary embodiment, there are two such register sets, one for the Enterprise System ("E Config Regs") and one for the Non-enterprise System ("P Config Regs"). In the example, the "E Config Regs" are active and the state information for the Camera 110 and the Touch Screen 108 (two stateful IO elements) is that related to the Enterprise System.

Stateful IO hardware elements whose state information cannot be made specific to the active system are not shared. For some 10 hardware implementations it may not be possible to isolate the state information belonging to separate systems. For example, current practice for connecting via Bluetooth® communication (registered mark of BLUETOOTH SIG, INC., Suite 350, 5209 Lake Washington Boulevard, Kirkland, Wash. 98033) is to use a dedicated embedded processor. All of the state associated with each connection is maintained in the embedded processor's memory. Thus, the simplest implementation uses separate Bluetooth subsystems for each processor as shown; namely, enterprise Bluetooth subsystem 132 and Non-enterprise Bluetooth subsystem 142.

A Communication Subsystem assures that all off-device communications to or from a given system are seen only by that system. Each computing system is uniquely identified to the Communication Subsystem 144. The function of these communication elements is not determined by which system is active.

Processors in the inactive systems will continue to run. They might, however, have to wait when they try to access shared IO elements.

Thus, the hardware prevents direct communication between on-device systems. Any information transfer between them is via communication through an off-device service such as email. The multiple internal computing systems are then as isolated as if they were in separate physical devices.

A number of possible modifications to the design can be used either separately or in combination.

Figure 2:
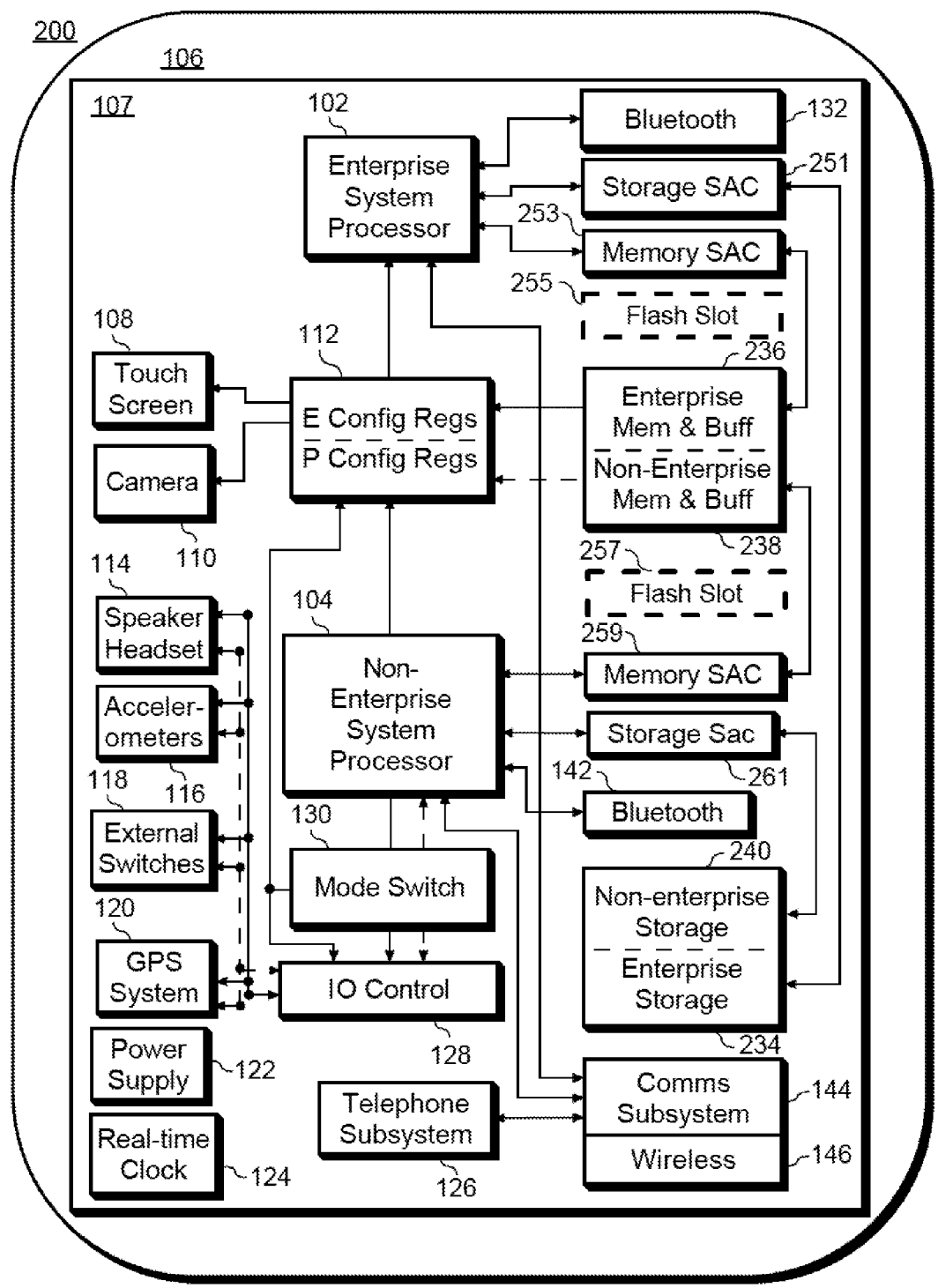
FIG. 2 shows a two-domain device with shared storage and memory, according to an aspect of the invention.

Sharing Storage & Memory:

The first modification can help reduce device cost by allowing multiple computing systems to share physical subsystems. An example 200 of this modification, with sharing of the memory subsystem, is shown in FIG. 2. Elements similar to FIG. 1 have the same reference number and will not be described again. The physical memory of the set of systems can be safely shared if separate areas of access are guaranteed by the hardware. For example, in one embodiment for the two system example, the high order bit of the memory address is be used to indicate which system is accessing memory. For example, for accesses from the Enterprise System Processor the high order bit is forced to 1 by hardware external to the processor, and for accesses from the Non-enterprise System Processor it is similarly forced to 0. For the avoidance of doubt, this is a non-limiting example, any suitable mechanism that allows the hardware to physically partition memory independent of the software is acceptable. Once the address space is thus partitioned, hardware is added to allow the processors to concurrently access the same physical memory subsystem. In particular, in this embodiment, Storage Access Channel/Control (SAC) 251 for the enterprise processor 102 controls access to enterprise storage portion 234 of the shared storage, and Storage Access Channel/Control (SAC) 261 for the Non-enterprise processor 104 controls access to Non-enterprise storage portion 240 of the shared storage. Furthermore, Memory SAC 253 for the enterprise processor 102 controls access to enterprise memory and buffer portion 236 of the shared memory and buffer, and Memory SAC 259 for the Non-enterprise processor 104 controls access to Non-enterprise memory and buffer portion 238 of the shared memory and buffer. In a similar manner, any subsystem that can be safely partitioned by external hardware can be shared between the multiple processors. The subsystem should guarantee that state information cannot leak between partitions. Note that separate flash slots 255, 257 are maintained for each system; i.e., flash slot 255 is associated with processor 102 and flash slot 257 is associated with processor 104.

Sharing Bluetooth:

Some devices, including Bluetooth communication subsystems, essentially hide their state information, making them difficult to share. However, a single Bluetooth subsystem can be shared between multiple systems with a few changes. Bluetooth was designed to replace wired connections between a computer and multiple peripheral devices. Each peripheral device associates with a single computer and sends only in response to a request from that computer. The computer transfers packets to the peripherals, tagging each with a handle to identify the peripheral. Bluetooth subsystems normally use an embedded processor to execute commands from the computer. The state associated with each connection is maintained in the embedded processor's memory and is managed by its firmware. To make Bluetooth sharable, the firmware is modified to maintain multiple sets of state information and to use only the set associated with the active system in response to a hardware input. For the two-system example, this can be done with a single input pin to switch between systems. The Bluetooth firmware would also have to assure that a peripheral's responses are only delivered to the system with which it is associated. The fact that peripheral devices can only associate with a single computer means that each Bluetooth peripheral will only be associated with one system. Thus, if the user wanted to listen to music from his Non-enterprise system on a Bluetooth connected headphone, he could not also simultaneously listen to a corporate podcast.

Figure 3:
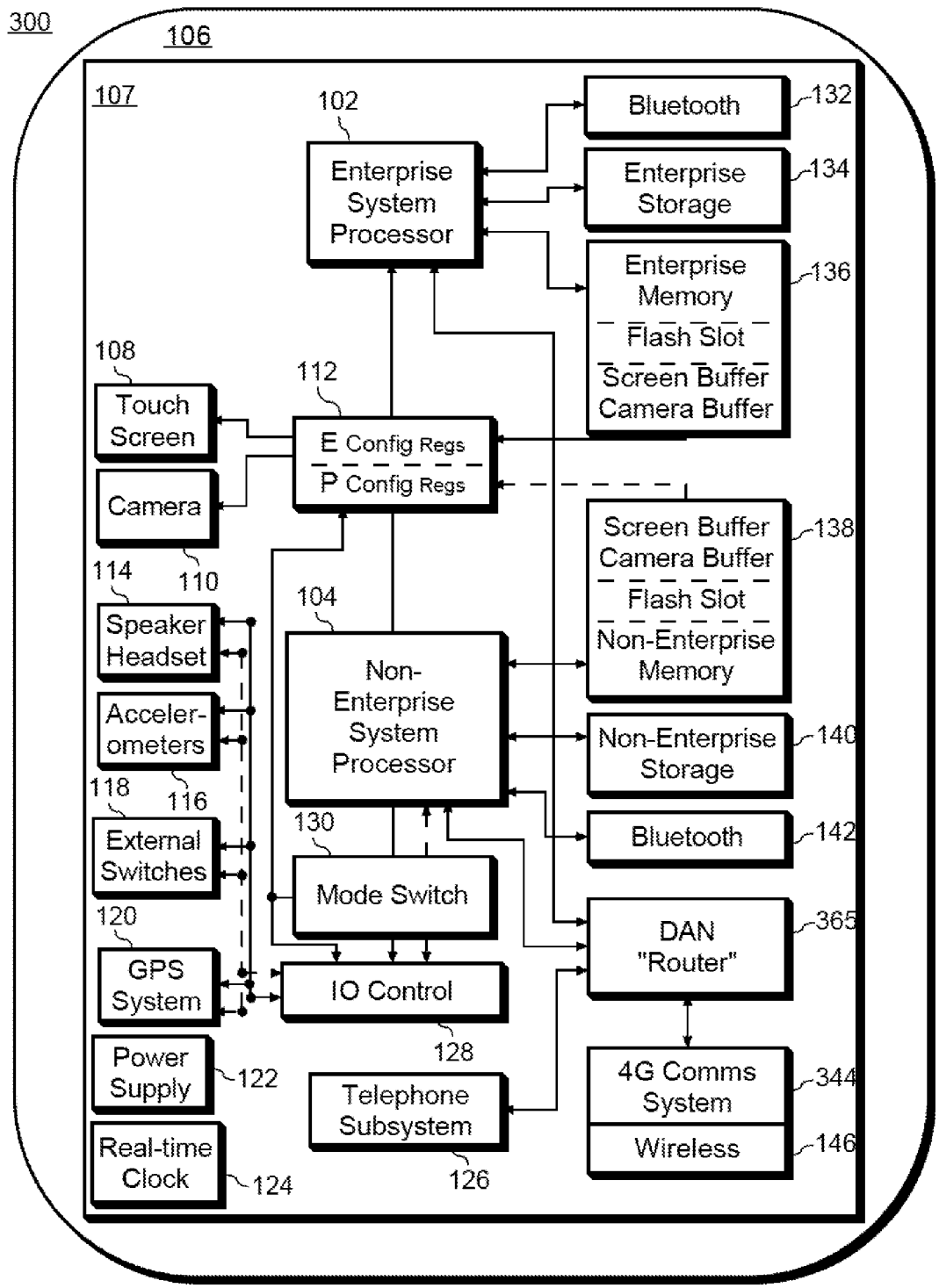
FIG. 3 shows a device area network router for a 4G device, according to an aspect of the invention.

Leveraging 4G-Communications:

A third modification concerns the Communication Subsystem. For 4G wireless communications, voice and data signals share a single IP data stream. In a 4G smart phone, this stream is delivered to both the telephone subsystem and the computing system (the 4G communications system is actually more complex than this but this simplified description is provided to illustrate the invention clearly without confusing and unnecessary detail). Reference should be had to the exemplary embodiments 300 of FIG. 3. In this example, the stream is delivered from the 4G communications system 344 to an on-board "router" 365 (i.e. a device that performs the router function, but with fixed functionality). Just like a router in a Local Area Network (LAN), the "router" delivers IP packets to only the addressed destination system, creating a Device Area Network (DAN). The several computing systems 102, 104 and the Telephone Subsystem 126 each have a separate Media Access Control (MAC) address. The 4G-communication system receives packets destined for multiple MAC addresses and the internal "router" is hardwired to send those packets to the correct address. The IP stack on each processor handles all of that processor's packets. With this approach, no modifications to the system software of the computing systems are required. FIG. 3 illustrates this for the exemplary two-domain device, and the approach is easily generalized to a many-domain device. Elements similar to FIG. 1 have the same reference number and will not be described again.

A second communication approach may be to exploit 4G more directly. This aspect assigns one MAC address to the device and gives each system and/or function (or groups of functions) a separate IP address (or port). The onboard router is hardwired to route packets to the correct IP address. The computing systems have different IP addresses for their 4G functions. In this aspect, in at least some instances, one side is not permitted to put its interface in promiscuous mode.

Asymmetric I/O Devices:

Mobile device operating systems vary in the support they provide for peripheral devices. For example, many BlackBerry devices have mechanical keyboards while the iPhones and Android devices generally do not. One or more embodiments need not provide the same set of IO devices for each internal system. Thus, a two-domain device that supported both a BlackBerry system and an Android system could have a mechanical keyboard that was seen and used only by the BlackBerry system.

Recapitulation of FIGS. 1-3:

By way of review, in FIG. 1, element 106 is a shared device package, element 107 is a shared system board; elements 108, 110 are IO devices with state; elements 114, 116, 118, 120 are stateless IO devices; and elements 122, 124 are shared support elements. Elements 132, 134, 136 are part of a first separate computing system using processor 102. Elements 138, 140, 142 are part of a second separate computing system using processor 104. Element 112 is a buffer control module. Element 126 is a cell phone controller. Element 144 is a controller for off-device communication.

Furthermore, in FIG. 2, element 106 is a shared device package, element 107 is a shared system board; elements 108, 110 are IO devices with state; elements 114, 116, 118, 120 are stateless IO devices; and elements 122, 124 are shared support elements. Elements 132, 251, 253, 255 are part of a first separate computing system using processor 102. Elements 257, 259, 261, 142 are part of a second separate computing system using processor 104. Element 112 is a buffer control module. Element 126 is a cell phone controller. Element 144 is a controller for off-device communication. Elements 251, 253, 259, 261 are secure access controllers for 236, 238, 240, 234.

Yet further, in FIG. 3, element 106 is a shared device package, element 107 is a shared system board; elements 108, 110 are IO devices with state; elements 114, 116, 118, 120 are stateless IO devices; and elements 122, 124 are shared support elements. Element 112 is a buffer control module. Element 126 is a cell phone controller. Element 344 is a controller for off-device communication. Element 365 is a device area network router. Elements 132, 134, 136 are part of a first separate computing system using processor 102. Elements 138, 140, 142 are part of a second separate computing system using processor 104.

Figure 4:
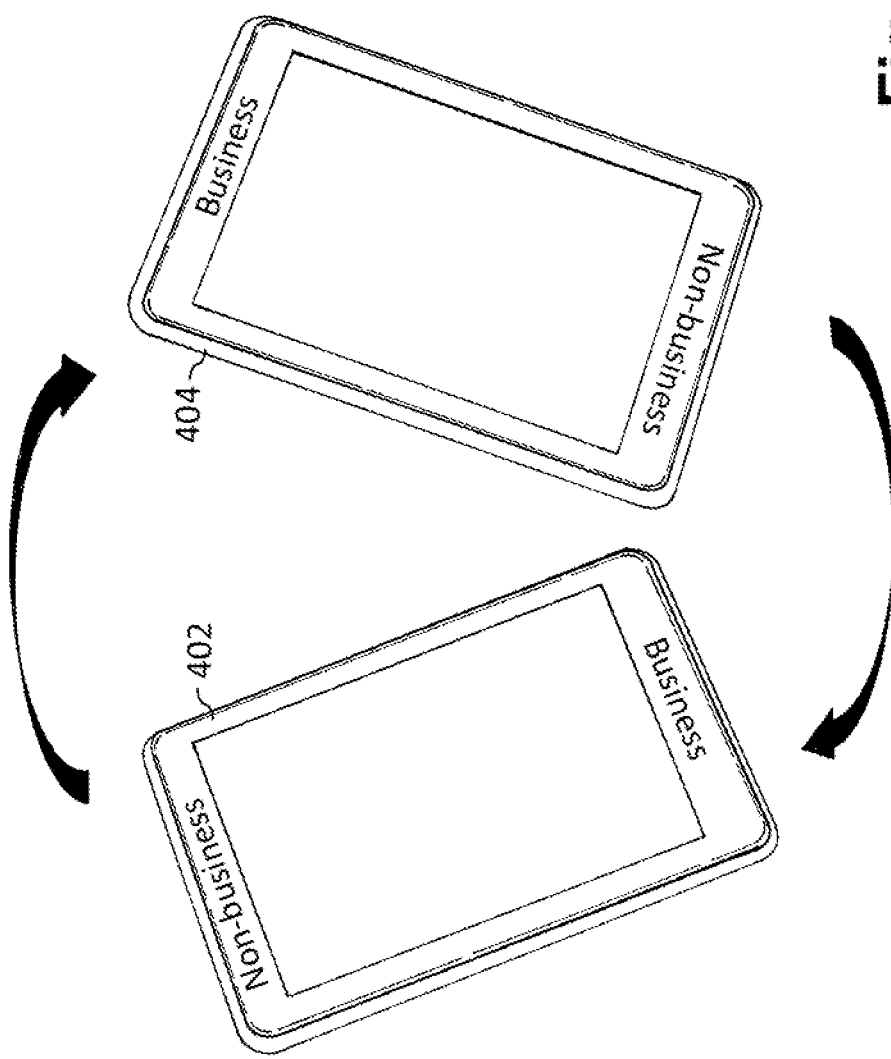
FIG. 4 shows a mode switch using rotation for a two-domain device, according to an aspect of the invention.

User-Driven Mode Switching:

As noted, one or more embodiments provide a Mode Switch mechanism that securely senses the user's desire to change active systems and then performs the switch. In one embodiment, the Mode Switch function is initiated by one or more physical switches or by soft-switches on the touch screen. For the common, two-domain device, one solution is to detect a change in device orientation, and to switch domains (and orientation of the screen) when the user turns the device 180 degrees, as seen in FIG. 4. With a symmetrical design of the external device elements (touch screen, microphone, speaker, and the like), a simple rotation and/or inversion of the device causes it to switch modes, changing the screen display essentially instantly. As seen in FIG. 4, the device is in a Non-enterprise orientation at 402, and when turned upside down, goes into a business orientation 404. A sensor similar to that used on current devices to change the screen orientation from landscape to portrait or vice-versa could be employed to trigger the change-over in this approach; various alternatives are discussed just below.

Figure 5:
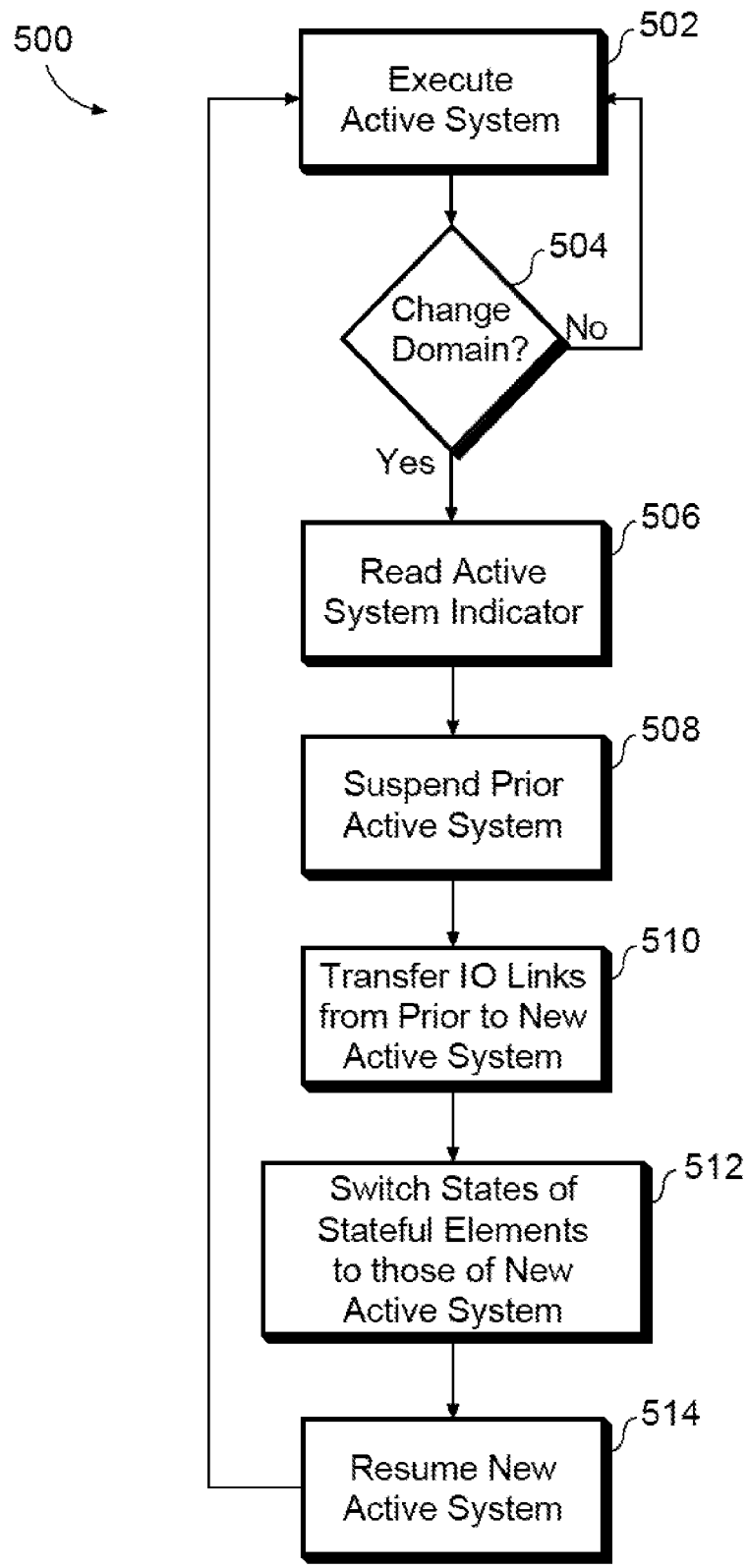
FIG. 5 shows a flow chart of exemplary method steps to switch modes, according to an aspect of the invention.

As shown in flow chart 500 of FIG. 5, in an exemplary embodiment, the steps taken by the controller to sense user intent and switch active systems are set forth below. At 502, the active system (enterprise or Non-enterprise, as the case may be, in the non-limiting example) is executing.

1. The control module 128 reads or otherwise acquires user intent from one of several possible sources:
   a. The accelerometer 116, which senses a predetermined change of device orientation
   b. A physical switch device 118 (like a slide switch) mounted in the device case
   c. A soft switch programmed into and displayed on the device's touch screen 108
   d. Other indicators 2. Once the desired active system is determined (i.e., decision block 504 yields a "Yes"—otherwise, if a "No," simply continue to execute the active system), the mode switch suspends the current active system. In the example of FIG. 5, the mode switch reads the active system indicator in step 506 and then suspends the prior active system in step 508. This includes saving and/or resetting any stateful memory or logic in the shared I/O components, such as buffers, registers in the camera, touchscreen controller, audio, and communication components and the like. Step 510 shows the transfer of IO links from the prior active system to the new active system and step 512 show the switching of states of the stateful elements to those of the new active system.

3. Initialize the selected operation mode so that it may begin operations, and continue operating in that domain, as per step 514, until an interrupt to halt or change modes is detected.

Geographically-Driven Mode Switching:

Mobile devices typically use GPS subsystems to determine their geographical location. Thus, location can be used to determine which computing systems can and cannot be active. For example, an enterprise system may only be allowed to be active when the device is on enterprise property to prevent sensitive information from being accessible off site. Also, and the Non-enterprise system may be deactivated while the device is on enterprise property to further isolate sensitive information.

User-Driven Mode Switching:

It is possible to limit access to one or more of the computing systems to only fully authenticated users. For example, many current devices that have access to enterprise systems require a password before they access to any functions except emergency phone calls. With this invention, it would be possible to allow free access to any user for the Non-enterprise system while requiring authentication for access to the enterprise-dedicated system. It would also be possible to have a separate system whose sole function is to determine who is using the device, perhaps by biometric and/or activity indicators. This system could regularly monitor activity to authenticate the actual device user and limit system access accordingly.

Exemplary Mode Switching Details

A preferred embodiment of the invention combines two or more independent computing systems into a physical package that its user sees as a single device. The individual computing systems are isolated so that it is not physically possible for any one system to observe or affect the operation of any other system. This isolation enables the systems to maintain their integrity. The user sees the device as an integrated whole with multiple modes. At any given time, the mode specifies which one system is active, and the device appears to the user as if that system were the only system in the device. The inactive systems could be functioning in the background, for example engaging in communication, but only when doing so does not change the operation of the active system. The device provides some method for the user to perform a mode switch to alter which system is active.

The active system will have full control of the user interface elements of the device. These are the input and output components through which the user operates the active computing system. One or more embodiments distinguish between two types of user interface elements: those whose operation does not depend on the history (or state) of their prior interaction with the active system and those whose operation does depend on this information. The former are referred to herein as stateless and the latter as stateful. Stateless elements range from a simple mechanical switch to complex subsystems such as that which tracks device orientation. In both cases, prior interaction by the active system does not change what that system (or any other system) sees when it interacts with the element. This assumes that the active system cannot turn the orientation system on or off, which is believed to be typical of current mobile devices.

A stateful element could be as simple as a light that the active system can turn on or off; such a light must be in the state set by the currently active system. The display screen is a more complex stateful element; its state includes the image displayed on the screen by the currently active system. In a preferred embodiment, the set of states, one state for each stateful element used by that computing system, is stored in a memory by or on behalf of each computing system. This storage mechanism is referred to herein as the Storage for Interface State.

The currently active system interacts with stateless user interface elements through Input/Output (IO) Transfer. There are multiple ways a system can implement such transfers where data flows between the system and the element through what are referred to herein as IO Linkages. In one aspect, an exemplary device prevents data flow between inactive systems and the stateless user interface elements. As noted below, some forms of IO transfer between inactive systems and stateless IO user interface elements may be possible in some cases without compromising system isolation. When a mode switch occurs, IO links to the previously active system are discontinued and links to the newly active system are established.

Mode switching for stateful elements is typically more complex. The active system may interact with some stateful elements through IO transfers. For example, it may send an "ON" command to a light. For other stateful elements, it may update the state directly rather than using IO transfers. For example, it could update the stored state of the screen and thereby change the displayed image. For IO transfers, the transfer links are managed as they are for stateless elements. Stateful elements, including those whose state the active system can change directly, will have a stored state associated with each system. When the mode switches, the stored state associated with the newly active system is substituted for the state associated with the previously active system for each stateful IO element.

Figure 6:
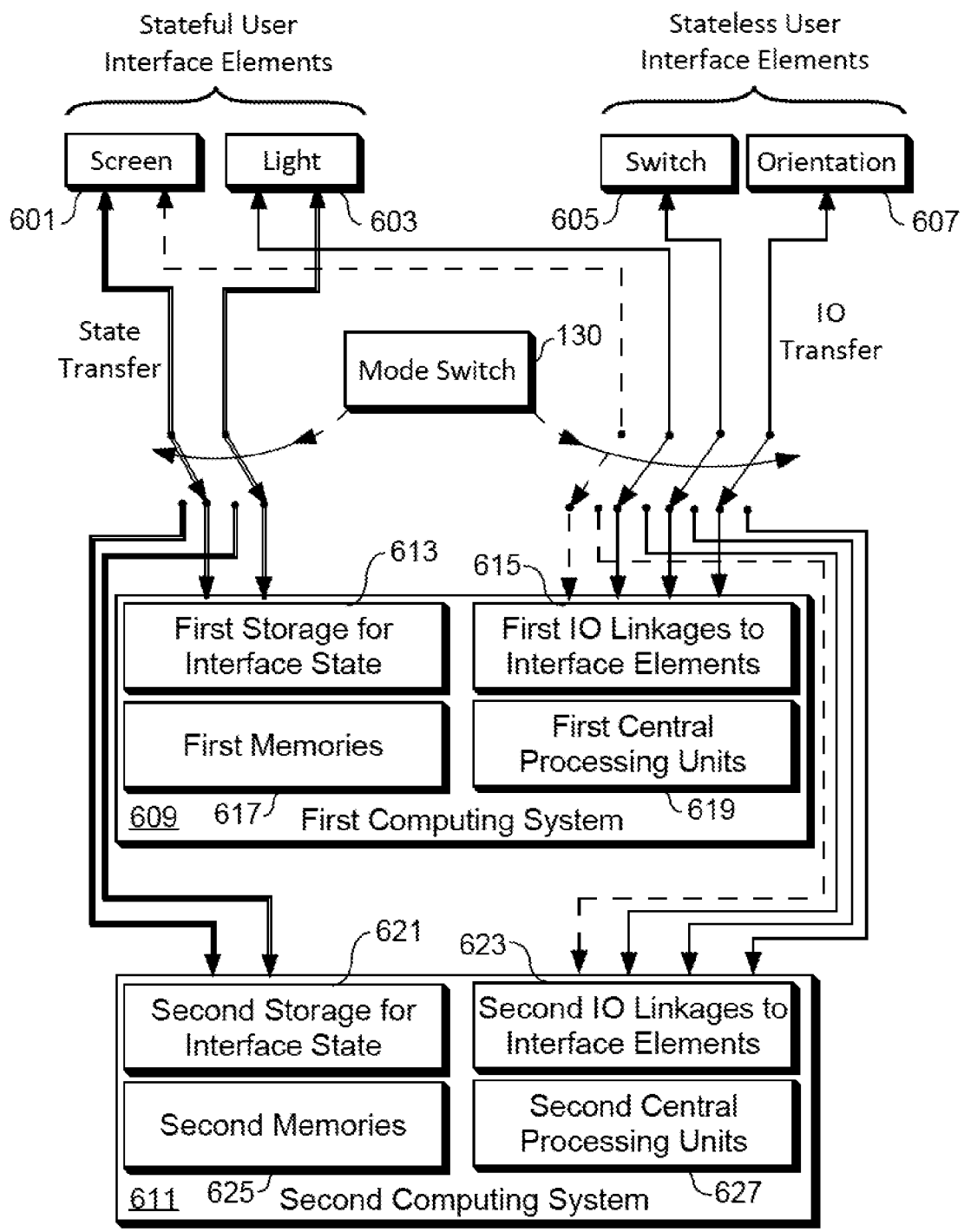
FIG. 6 shows an exemplary system, according to an aspect of the invention.

A simple embodiment of this mode switching activity is depicted in FIG. 6. The figure shows a dashed IO Transfer line from blocks 615, 623 to the Screen 601 since the screen could, in some instances, be fully controlled by changes to its state and not need IO transfers. Also, the state storage 613, 621 is shown within the System box 609, 611 because it is logically part of the system, but in some cases, it may be physically separate from the system.

FIG. 6 thus depicts an exemplary computer device including a set of one or more user interface elements each of which is either a stateful interface element (screen 601, light 603) or a stateless interface element (switch 605, orientation 607). Also included is a first computing system 609 including a first set of IO linkages 615, a first storage 613 for the set of states of the stateful user interface elements, one or more first memories 617 and one or more first central processing units (CPUs) 619. A further element includes a second computing system 611 including a second set of linkages 623, a second storage 621 for the set of states of the stateful user interface elements, one or more second memories 625, and one or more second central processing units 627. The first memories are isolated from the second memories, the first state storage is isolated from the second state storage, and the first CPU(s) is/are isolated from the second CPU(s). A still further element includes a mode switch 130 which determines which set of linkages are connected to the user interface elements and which stored set of interface states are available to the stateful user interface elements. In a first mode, the first computing system 609 is connected to at least one user interface element, via linkages 615. In a second mode, the second computing system is connected to at least one user interface element, via linkages 623.

Communication—

Connecting the device to various communication systems can be carried out in a variety of ways. These include cellular communications, Bluetooth links and other networking technologies as described herein. On-device communication, including the notion of a Device Area Network, is also described herein.

Sharing—

In some cases, only the active system is allowed to access the user interface elements. However, some elements, including the power supply, real-time clock, system board, case, and the like, are not affected by computation and can be freely shared. Also, some input devices, e.g. switches and buttons, can be "freely" shared and accessed by any system at any time. If the device is used in an environment were one is concerned about software from one side making unauthorized observations on activities of the other side then those devices which could otherwise be freely shared would not be shared.

Many Systems—

For simplicity, only two computing systems have been illustrated and discussed thus far. However, some embodiments include devices with more than two systems.

Device Examples—

Non-limiting examples of stateless input devices include switches, buttons, a GPS system, and the like; non-limiting examples of stateless output devices include a speaker, headset connector, photo flash, accelerometers, and the like; non-limiting examples of stateful input devices include Bluetooth modules, a camera, a touch screen, and the like; and non-limiting examples of stateful output devices include a display, Bluetooth modules, and the like.

Sharing Main Memory & Storage Devices—

As noted, it is possible to provide the required isolation within a single main memory device and/or a single storage device by using hardware-enforcement.

Mode Switch Mechanisms—

Several mechanisms can be used to initiate the mode switch. They include geographical location, orientation, accelerometer signal, gesture on touch screen, mechanical switch, software command, and the like. Also, modes and mode switching are also valuable in a device that does not use physical isolation of computing systems but rather supports multiple personalities in another way. Some embodiments address software-based multi-personality devices.

Location-Dependent Control—

In some instances, it may be valuable to allow or disallow a given computing system to become active in certain locations. For example, it may be desirable that an enterprise system only be allowed to be active when the device is on enterprise property. It may also be desirable to disallow an active Non-enterprise system while the device is on enterprise property.

Asymmetric Systems— in some cases, the separate computing systems can be very different—different processors, operating systems, user interface devices, and so on. For example, one computing system may use a physical keyboard while another does not recognize the idea of a keyboard.

User Authentication—

As noted, in some instances, the device may include the ability to authenticate the user (for example, as he or she is using the unit) and to limit access to one or more of the computing systems based on this authentication.

Non-Enterprise Device—

As noted, some embodiments include a purely Non-enterprise device where one domain is used for normal activities and one for sensitive matters that need extra protection. A trusted service can be used to manage the sensitive domain, giving it a well-defined level of security.

Advantageously, one or more embodiments provide a high level of assurance that separate domains remain separate, because one or more embodiments employ separate, physically isolated processors. Furthermore, one or more embodiments allow the separate domains to be quite different, since one or more embodiments employ separate, physically isolated processors (software based hypervisor approaches typically have practical limits that require the separate virtual machines to have the same processor architecture).

Figure 9:
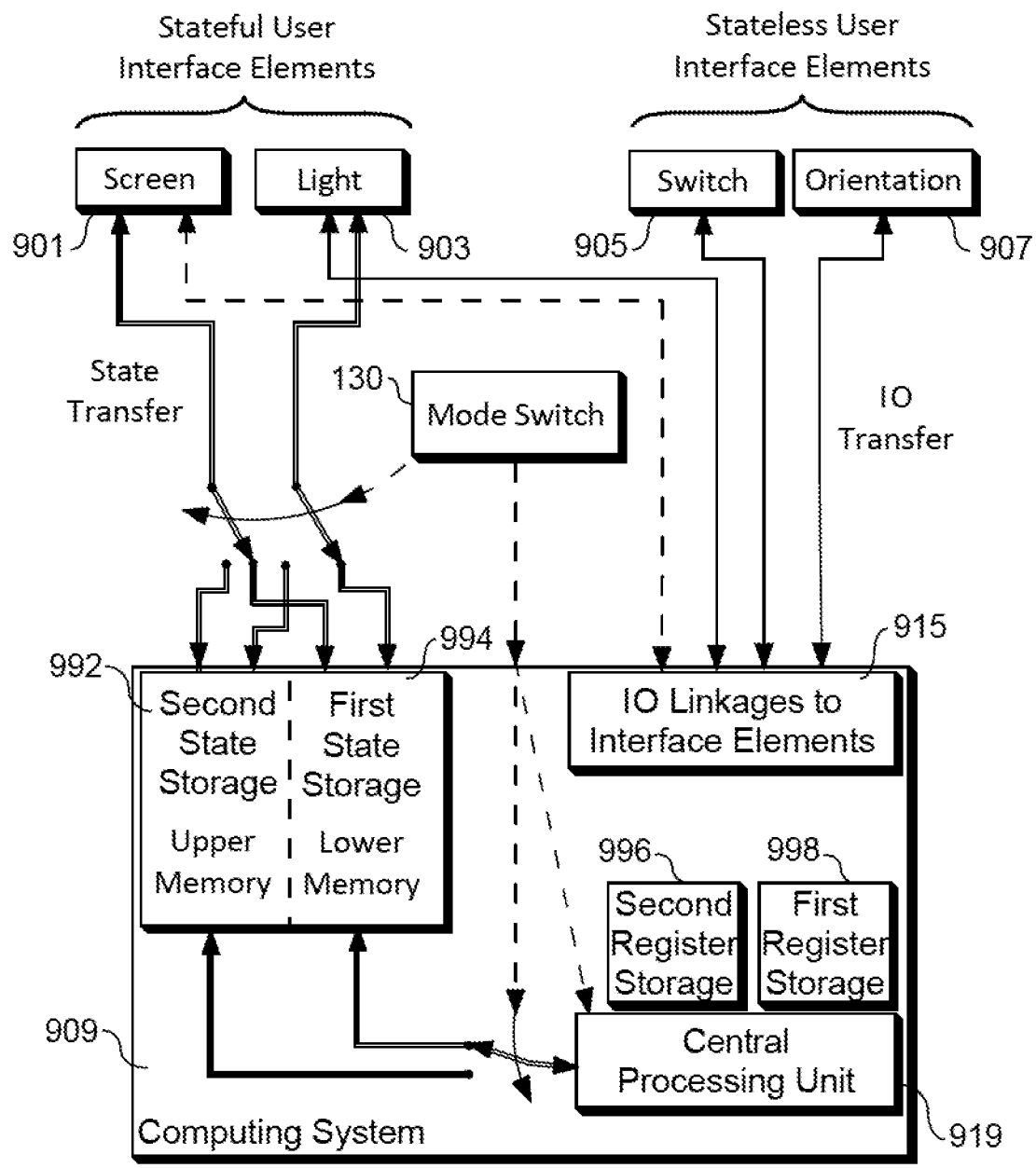
FIG. 9 shows an exemplary hardware embodiment of single-processor device, according to an aspect of the invention.
Figure 10:
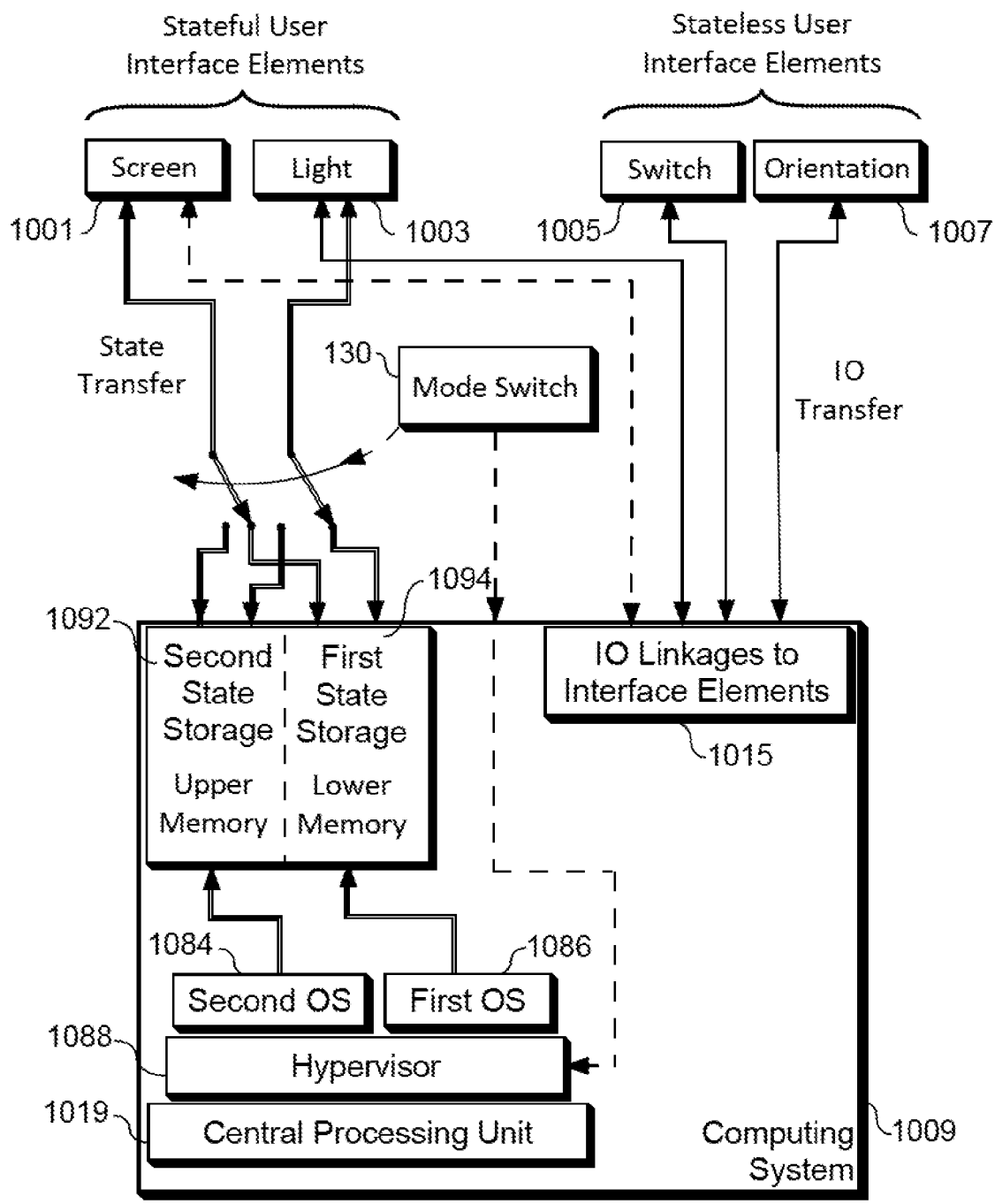
FIG. 10 shows an exemplary software embodiment of single-processor device, according to an aspect of the invention.

Note, however, that while one or more embodiments are directed to devices that use multiple processors to support multiple personalities, such devices can also be designed with a single processor. FIG. 9 shows an exemplary hardware approach that leverages changes to the internal structure of the processor to do so, and FIG. 10 shows a software design using a hypervisor layer.

With attention now to FIG. 9, note hardware-based single-processor device with two personalities is depicted therein. FIG. 9 depicts a single-processor device that uses modifications to the memory subsystem and to the processor internals to support two isolated, independent personalities. The device structure outside the computing system is similar to that in FIG. 6.

As before, there are stateful (e.g., screen 901 and light 903) and stateless (e.g., switch 905 and orientation 907) IO elements and a mode switch 130 that determines which of two personalities is active. The mode switch functions as it does in the device of FIG. 6. It determines which of two state storage elements 994, 992 specifies the state of the stateful IO elements 901, 903 by controlling the switch depicted in the figure. Also, mode switch 130 provides a binary signal indicating which personality is active; this signal is used by the computing system to perform two functions.

Note single computing system 909 with IO linkages 915 to the interface elements 901, 903, 905, and 907.

In the embodiment of FIG. 9, the lower half of the computing system memory address space 994 is accessed by only the first personality with the upper half 992 reserved for the second personality. A portion of each half is dedicated to storing the stateful IO device interface states corresponding to the associated personalities. The most significant bit of the address bus is controlled by the mode switch 130 and is set to 0 when the first personality is active and to 1 when the second personality is active (of course, the opposite convention could also be employed). Thus, the processor 919 can access only the appropriate half of memory based on which personality is active. This is the first of two functions for which the computing system uses the binary signal from the mode switch 130.

The second function is to swap processor register content when there is a transition of active personality. At a transition, the processor 919 is stopped, the content of the registers 998, 996 is changed, and the processor is restarted. When the transition is from first personality to second personality, the current register contents are stored in the first register storage 998 and new values are loaded from the second register storage 996; when the transition is back to first personality, the process is reversed. In this way, the processing system operates in only one personality at a time and the two personalities are fully isolated.

FIG. 10 shows a software-based single-processor device with two personalities. The software-based single-processor embodiment uses a software technique called a hypervisor 1088 (or virtual machine manager). Hypervisors, in and of themselves, are well known; given the teachings herein, the skilled artisan will be able to employ a hypervisor to implement one or more embodiments. Hypervisors are one of many hardware virtualization techniques that allow multiple operating systems 1086, 1084 to run independently and concurrently on a single processor 1019. The operating systems managed by a hypervisor each see a separate virtual operating platform. The embodiment in FIG. 10 shows a Type 1 hypervisor 1088 running on the processor 1019 of computing system 1009, controlling the hardware and managing the two operating systems 1086, 1084.

Hypervisor 1088 assures that each operating system accesses only a defined region of the address space; in the example of FIG. 10, upper memory 1092 and lower memory 1094. Unlike classic hypervisors that allow the operating systems to run simultaneously, in the exemplary embodiment of FIG. 10, hypervisor 1088 allows only one operating system to be active at any time. It uses the signal from the mode switch 130 to determine which will be functioning. Thus, only the active operating system, which represents the active personality, is able to interact with the stateless and stateful IO devices and, hence, with the user. Elements 1001, 1003, 1005, 1007, and 1015 are analogous to elements 901, 903, 905, 907, and 915 in FIG. 9.

In some embodiments, the inactive personality can run in the background without such user interaction.

Both the multiple processor design of FIG. 6 and the hardware-based single-processor device in FIG. 9 offer hardware-enforced separation between personalities. This separation provides the strongest guarantee of isolation and may be more attractive to security-conscious users, in some instances. Nevertheless, the software-based approach in FIG. 10 provides good guarantees of separation.

Both the multiple processor design of FIG. 6 and the software-based single-processor device of FIG. 10 can be used with current processor designs. The changes needed for the hardware-based approach of FIG. 9 can be implemented by the skilled artisan, given the teachings herein.

The multiple processor approach of FIG. 6 advantageously offers the possibility of using different processor architectures for the different personalities. Furthermore, with multiple processors, the inactive personality can run in the background, and, for example, engage in communications. However, the single-processor embodiments may advantageously offer reduced cost and extended battery life.

Given the discussion thus far, and with attention to FIG. 6, it will be appreciated that, in general terms, an exemplary apparatus, according to an aspect of the invention, includes at least one user interface element (e.g., stateful user interface element such as 601 and/or 603); a first isolated computational entity (e.g., first computing system 609 including a first memory 617, a first processor 619 coupled to the first memory, and optionally a first interface state storage unit 613 associated with the first processor and configured to store a first state of the at least one stateful user interface element). Also included is a second isolated computational entity (e.g., second computing system 611 including a second memory 625 isolated from the first memory, a second processor 627 coupled to the second memory and isolated from the first processor, and optionally a second interface state storage unit 621 associated with the second processor, isolated from the first interface state storage unit, and configured to store a second state of the at least one stateful user interface element). Yet further, the apparatus includes a switching arrangement configured to:
  in a first mode, connect the first isolated computational entity to the at least one user interface element (and, optionally, when the at least one user interface element is stateful, to make the first state available to the at least one stateful user interface element); and
  in a second mode, connect the second isolated computational entity to the at least one user interface element (and, optionally, when the at least one user interface element is stateful, to make the second state available to the at least one stateful user interface element).

Finally, the apparatus includes a shared housing, such as 106 in FIG. 1, for the at least one user interface element, the first isolated computational entity, the second isolated computational entity, and the switching arrangement.

In some cases, the first isolated computational entity includes a first computing system 609 including a first memory 617, and a first processor 619 coupled to the first memory; and the second isolated computational entity includes a second computing system 611 including a second memory 625 isolated from the first memory, and a second processor 627 coupled to the second memory and isolated from the first processor. The processors 619, 627 could be on separate integrated circuit chips or could be separate cores on the same chip, for example.

In a non-limiting example, the switching arrangement includes a mode switch 130, a first set of input-output linkages 615 associated with the first computing system, and a second set of input-output linkages 623 associated with the second computing system.

Some embodiments include at least one stateless user interface element, such as switch 605 and/or orientation sensor 607; in such cases, the switching arrangement can be further configured to:

in the first mode, connect the first computing system to the at least one stateless user interface element; and
in the second mode, connect the second computing system to the at least one stateless user interface element.

Some embodiments further include a cellular telephone subsystem 126 shared by the first and second computing systems.

Some embodiments further include a first short distance wireless personal area network module (e.g., Bluetooth module 132) coupled to the first computing system and a second short distance wireless personal area network module (e.g., Bluetooth module 142) coupled to the second computing system.

Referring now to FIG. 3, in some cases, the first computing system has a first media access control address and the second computing system has a second media access control address, and the apparatus further includes a device area network router 365 which is hardwired to receive packets and to route given ones of the packets to one of the first media access control address and the second media access control address.

Still referring to FIG. 3, in some cases, the apparatus has a media access control address, the first computing system is assigned a first internet protocol address and the second computing system is assigned a second internet protocol address, and the apparatus further includes a device area network router 365 which is hardwired to receive packets and to route given ones of the packets to one of the first internet protocol address and the second internet protocol address.

In some instances, the first and second computing systems share at least one of a power supply 122 and a real-time clock 124.

Figure 7:
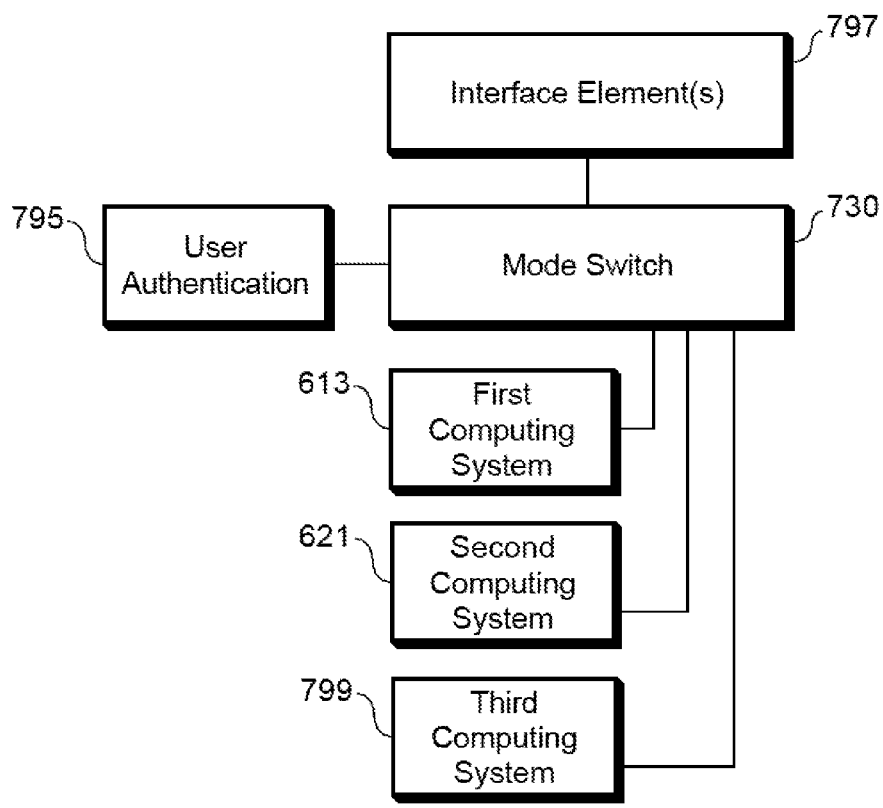
FIG. 7 shows an exemplary system with mode switching among three computing systems, according to an aspect of the invention.

Referring now to FIG. 7, wherein similar elements have received the same reference characters as in the other figures and will not be described again, some embodiments further include at least a third computing system 799 including a third memory isolated from the first and second memories, a third processor isolated from the first and second processors, and a third interface state storage unit isolated from the first and second interface state storage units. The third interface state storage unit is configured to store a third state of the at least one stateful user interface element. The third memory, third processor, and third interface state storage are omitted from FIG. 7 to avoid clutter but could be represented in the same way as in the other figures. In the embodiment of FIG. 7, (mode) switching arrangement 730 is further configured to, in a third mode, connect the third computing system 799 to the at least one stateful user interface element and the at least one stateless user interface element (both generally represented as 797), and to make the third state available to the at least one stateful user interface element.

Non-limiting examples of the stateful user interface element include a display, a camera 110, a touch screen 108, and a short distance wireless personal area network module 132, 142.

Non-limiting examples of the stateless user interface element include a speaker 114, a headset connector 114, a photo flash of camera 110, an accelerometer 116, a switch 118, a button, and a global positioning system receiver 120.

As noted, in some instances, such as FIG. 1, the second memory is isolated from the first memory by being a separate unit therefrom. On the other hand, in other instances, such as FIG. 2, the first and second memories are realized in a single device but the second memory is isolated from the first memory by hardware enforcement.

In some cases, the first computing system is an enterprise computing system including processor 102 and the second computing system is a Non-enterprise computing system including processor 104.

However, the example of the previous paragraph is not limiting; in other instances, the first computing system is a first Non-enterprise computing system and the second computing system is a second Non-enterprise computing system having a higher security level than the first Non-enterprise computing system (e.g., for banking or healthcare).

Turning again to FIG. 7, some embodiments include a user authentication unit 795 (e.g., fingerprint recognition, speaker recognition, other biometrics, routine to accept a user identification number (e.g., PIN), cryptographic module, or the like) which provides an authentication result and limits access to at least one of the first and second computing units based on the authentication result (for example, in conjunction with mode switch 730). The user authentication unit can also be used to drive the mode switch. The device can be configured to not switch modes unless the proper biometric identification is presented; e.g., via fingerprint scanner 199.

Some embodiments include a location sensor such as GPS system 120; in such cases, use of at least one of the first and second computing systems can optionally be controlled in accordance with a signal from the position sensor.

As noted, the first and second computing systems can be heterogeneous. For example, the first and second computing systems may have different operating systems and/or different device compatibility; and/or the first and second processors can be of different types.

As noted elsewhere, the switching arrangement can be responsive to many different factors or a combination of factors; for example, one or more of geographical location; orientation of the apparatus; an accelerometer signal; a touch screen gesture; a mechanical switch input; biometric input; and a software command.

In another aspect, an exemplary method includes providing an apparatus of the kind described, operating the apparatus in the first mode, and switching the apparatus from the first mode to the second mode. In some such cases, the first computing system has a first media access control address and the second computing system has a second media access control address, and further steps include receiving packets at a device area network router; and routing given ones of the packets to one of the first media access control address and the second media access control address. On the other hand, in other such cases, the apparatus has a media access control address, the first computing system is assigned a first internet protocol address and the second computing system is assigned a second internet protocol address, and further steps include receiving packets at a device area network router; and routing given ones of the packets to one of the first internet protocol address and the second internet protocol address. In some cases, the switching step further includes making the second state available to the at least one stateful user interface element.

As noted, mode switching is not limited to cases with physically isolated computing systems. Thus, in another aspect, an exemplary apparatus includes a memory; a processor coupled to the memory; a computer-readable storage medium, storing in a non-transitory manner instructions which, when loaded into the memory and executed by the processor, cause the apparatus to operate in one of a first personality and a second personality; and a switching arrangement. The switching arrangement is associated with the processor, and causes the apparatus to switch between the first personality and the second personality. The switching arrangement may, for example, be responsive to at least one of: geographical location; orientation of the apparatus; an accelerometer signal; a touch screen gesture; a mechanical switch input; and a software command.

In still another aspect, a further exemplary method includes the steps of providing a computer-readable storage medium, storing in a non-transitory manner instructions which, when loaded into a memory and executed by a processor coupled to the memory, cause the processor and the memory to operate in one of a first personality and a second personality; providing a switching arrangement which causes the processor and the memory to switch between the first personality and the second personality; and, using the switching arrangement, switching the processor and the memory between the first personality and the second personality. The switching arrangement may, for example, be responsive to at least one of: geographical location; orientation of the apparatus; an accelerometer signal; a touch screen gesture; a mechanical switch input; biometric input; and a software command.

In a further aspect, an exemplary apparatus includes a processor and a memory coupled to the processor. In some instances, the memory stores, in a non-transitory manner, instructions which, when executed by the processor, cause the apparatus to operate in one of a first personality and a second personality. In some instances, this functionality is implemented by hardware. In one or more embodiments, there is isolation between the personalities. One or more embodiments include one or more IO devices which can be stateful, stateless, or a mix of both. In some instances, a single processor switches personalities (modes or contexts) with hardware techniques. Reference is made to U.S. patent application Ser. No. 13/408,170 filed Feb. 29, 2012, of Richard H. Boivie et al., entitled "A PROCESSOR AND DATA PROCESSING METHOD WITH NON-HIERARCHICAL COMPUTER SECURITY ENHANCEMENTS FOR CONTEXT STATES." Pertinent portions thereof are reproduced herein; nevertheless, out of an abundance of caution, the complete disclosure of Boivie et al. is expressly incorporated herein by reference in its entirety for all purposes. Note that "contexts" are generally synonymous with "modes" and "personalities" as used herein. In some instances, mode switching is activated by software (e.g., hypervisor). In some instances, mode switching is activated by an external switching mechanism (hardware). Note that in general, there can be one or more processors and one or more memories, but embodiments such as those shown in FIGS. 9 and 10 do not rely on separate processors for isolation between personalities, as in FIG. 6.

Thus, one or more embodiments include a switching arrangement such as another software program, a separate hardware switch, an accelerometer, time of day, a hypervisor, a multiple processor arrangement, or the like. One or more embodiments achieve isolation between personalities.

The switching arrangement is associated with the processor, and causes the apparatus to switch between the first personality and the second personality. As alluded to elsewhere, such switching could be responsive, for example, to one or more of geographical location; orientation of the apparatus; an accelerometer signal; a touch screen gesture; a mechanical switch input; and a software command.

For example, as shown in FIG. 9, some implementations include a way to tell the processor to only run a program in the upper half or lower half of memory. In some cases, a mechanism in hardware can make the switch; say, fire an interrupt and it stores everything and runs the other program. Only one personality runs at a time.

In FIG. 10, the multiple personalities are the separate virtual machines; each virtual machine supports a personality above it. When switching from one to another I/O devices with memory are also switched.

In a still further aspect, an exemplary method includes providing an apparatus as described, including the switching arrangement; and, using the switching arrangement, switching the processor and the memory between the first personality and the second personality. The switching can, for example, be responsive to one or more of the factors listed herein.

Figure 11:
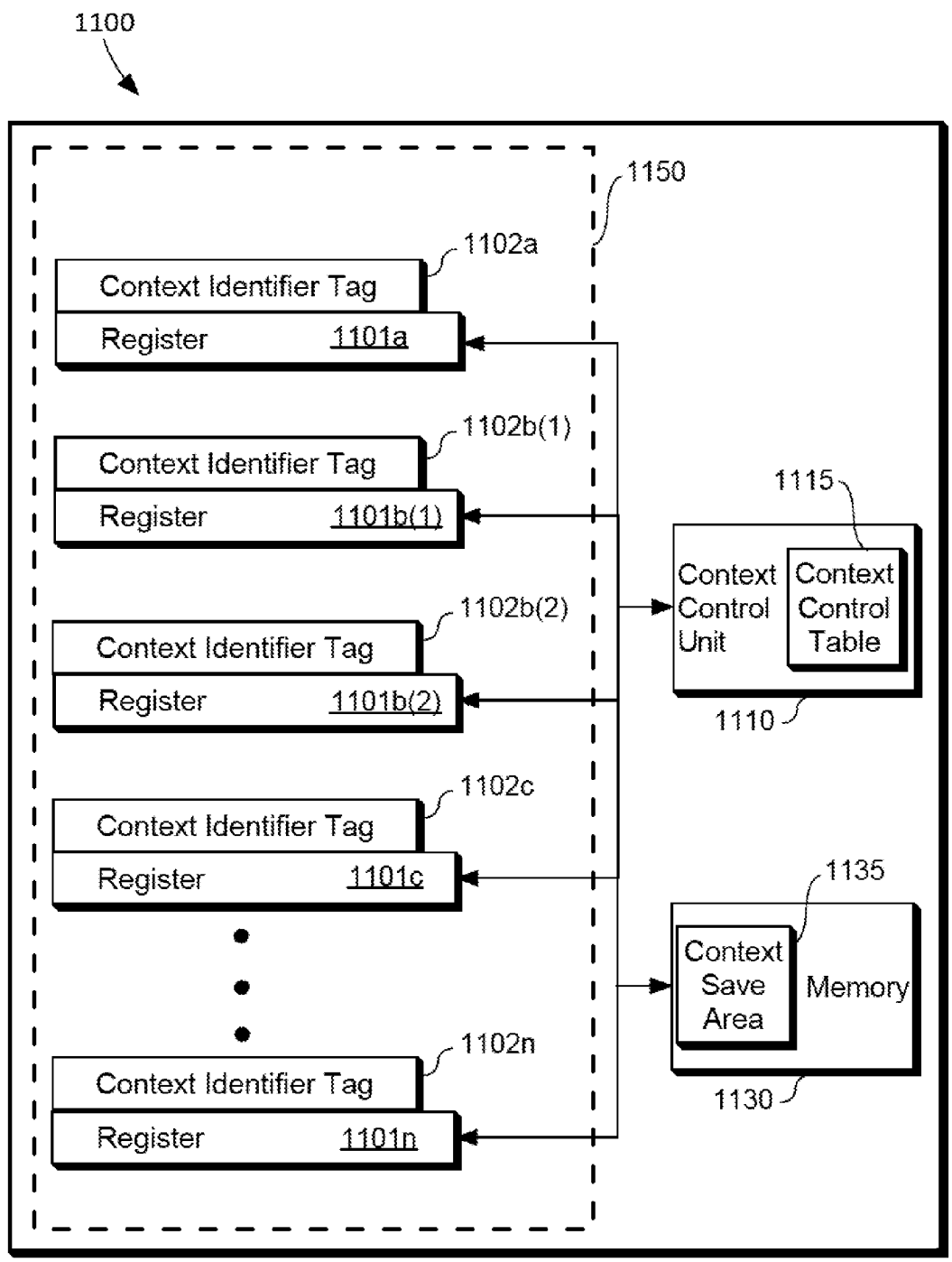
FIG. 11 is a schematic diagram illustrating an embodiment of a data processor that can be utilized to provide two or more isolated computational entities according to an aspect of the invention.

FIG. 11 shows an exemplary data processor 1100 (i.e., a microprocessor, a computer processing unit (CPU, etc.)) from the aforementioned U.S. patent application Ser. No. 13/408,170 that provides non-hierarchical computer security enhancements for context states. The data processor 1100 can include at least one or more registers 1101$a$-$n$, a context control unit 1110 and a memory 1130. Each of these registers 1101$a$-$n$ can be adapted to store context information (i.e., context states) of a context (i.e., of a thread of execution). For the most part, each of these registers 1101$a$-$n$ can be temporarily tagged with a context identifier tag (see tags 1102$a$-$n$) of a fixed length (e.g., 8-bits). Each context identifier tag 1102$a$-$n$ can be associated in a context control table 1115 (e.g., in the context control unit 1110) with a particular context (i.e., a particular thread of execution) that is currently in operation and using that register. Tagged registers can include, for example, program registers, such as a general purpose register and a floating-point register, and/or branch registers, such as a link register, a count register and a condition register. It should be noted that some registers should, however, remain untagged. Untagged registers can, for example, include registers for the timer/clock, for debug control, for storage control, and for process control. The context control unit 1110 can be operatively connected to the registers and can use the context identifier tags 1102$a$-$n$ associated with the corresponding contexts (i.e., corresponding threads of execution) to control access by the contexts (i.e., by the threads of execution) to the register(s) 1101$a$-$n$ and, thereby to control access to the context information (i.e., the context states of the threads of execution) contained therein.

For example, in one embodiment of the data processor 1100, the context control unit 1110 can receive, from a first context (i.e., from a first thread of execution), an access request for a specific register (e.g., register 1101$a$). In response, the context control unit 1110 can then determine whether the specific register 1101$a$ is tagged with a first context identifier tag associated with the first context. That is, the context control unit can determine whether the context identifier tag 1102$a$ on the specific register is the first context identifier tag associated in the context control table 1115 with the first context, thereby indicating that the contents of the specific register 1101*a* (i.e., that the states saved in the specific register 1101*a*) are owned by the first context. When the specific register 1101*a* is tagged with the first context identifier tag (i.e., when context identifier tag 1102*a* is the first context identifier tag), the context control unit 1110 can provide the first context with read and write access to the specific register 1101*a*. As used herein, read and write access of a context to a register means allowing the context to see, modify and/or write-over states saved in the register.

However, when the specific register 1101*a* is tagged with a second context identifier tag associated with a second context (i.e., when the context identifier tag 1102*a* does not match the first context identifier tag but instead is a second context identifier tag, thereby indicating that a second context owns the contents of the specific registers 1101*a*)), the context control unit 1110 can use the second context identifier tag to save, in a context save area 1135 of the memory 1130, all second context information (i.e., all second states of the second context) from the specific register 1101*a*. It should be noted that the specific save location (i.e., the memory address) for the second context information of the second context within the context save area 1135 can be specified in the context control table 1115 (as indexed by the second context identifier) and this specific save location can be addressable only by a more privileged, trusted, context that has been given control of memory management. The context control unit 1110 can then use the first context identifier tag to restore, to the specific register 1101*a*, first context information (i.e., previously saved first states of the first context) from another location in the context save area 1135, as specified in the context control table 1115 and the specific register 1101*a* can be retagged with first context identifier tag (i.e., the context identifier tag 1102*a* can be switched from the second context identifier tag associated with the second context to the first context identifier tag associated with the first context). Only then can the context control unit 1110 provide the first context with read and write access to the specific register 1101*a*.

When the specific register 1101*a* is tagged with a second context identifier tag associated with a second context (i.e., when the context identifier tag 1102*a* does not match the first context identifier tag but instead is a second context identifier tag), the context control unit 1110 can use the second context identifier tag to save, in a context save area 1135 of the memory 1130, all second context information (i.e., second states of the second context) from the specific register 1101*a*. Saving all the second context information prior to providing the first context with access to the specific register 1101*a* can be time consuming. Therefore, alternatively, the second context information (i.e., of second states of the second context) can be saved "on demand" (i.e., only when those second states are referenced by the first context) or a portion of the second context information (e.g., selected second states) can be saved initially and the remainder can be saved "on demand".

In another aspect, the data processor 1100 can include multiple copies of a specific register (see copies (1) and (2) of specific register 1101*b*) and can receive, from a first context, an access request for that specific register 1101*b*. In this case, the context control unit 1110 can first determine whether any of the copies (1) or (2) of the specific register 1101*b* is tagged with a first context identifier tag associated with the first context. That is, the context control unit 1110 can determine whether the context identifier tag 1102*b*(1) or 1102*b*(2) on any of the copies (1) or (2), respectively, of the specific register 1101*b* is the first context identifier tag associated in the context control table 1115 with the first context. When at least one of the copies of the specific register is tagged with the first context identifier tag, the context control unit 1110 can select a first copy (e.g., copy (1) of specific register 1101*b*) tagged with the first context identifier tag and can provide the first context with read and write access to that first copy 1101*b*(1).

However, when none of the copies (1) or (2) of the specific register 1101*b* is tagged with the first context identifier tag, the context control unit 1110 can select one of the copies of the specific register (e.g., a second copy (2) of the specific register 1101(*b*), which is tagged with a second context identifier tag associated with a second context). Then, the context control unit 1110 can use the second context identifier tag to save, in the context save area 1135 of the memory 1130, all second context information (i.e., all second states of the second context) from the second copy. As in the previously described embodiment, the specific save location (i.e., the memory address) for the second context information of the second context within the context save area 1135 can be specified in the context control table 1115 (as indexed by the second context identifier) and this specific save location can be addressable only by a more privileged, trusted, context that has been given control of memory management. Next, the context control unit 1110 can use the first context identifier tag to restore first context information (i.e., previously stored first states of the first context) from another location in the context save area 1135, as specified in the context control table 1115, to the second copy (2) of specific register 1101*b* and the second copy (2) of the specific register 1101*b* can be retagged with first context identifier tag (i.e., the context identifier tag 1102*b*(2) can be switched from the second context identifier tag associated with the second context to the first context identifier tag associated with the first context). Only then can the context control unit 1110 provide the first context with read and write access to the second copy (2) of the specific register 1101*b*.

When the second copy (2) of the specific register 1101*b* is tagged with a second context identifier tag associated with a second context, the context control unit 1110 can use the second context identifier tag to save, in a context save area 1135 of the memory 1130, all second context information (i.e., second states of the second context) from the second copy (2) of the specific register 1101*b*. Saving all the second context information prior to providing the first context with access can be time consuming. Therefore, alternatively, the second context information (i.e., of second states of the second context) can be saved "on demand" (i.e., only when those second states are referenced by the first context) or a portion of the second context information (e.g., selected second states) can be saved initially and the remainder can be saved "on demand".

In yet another aspect, the data processor 1100 can further include a pool 1150 of registers. In this case, there may be more registers in the pool 1150 than are required for operation of all of the contexts (i.e., some of the registers may be free or, more particularly, empty). The context control unit 1110 can receive, from a first context, an access request indicating a first register name. In this case, the context control unit 1110 can first determine whether any register in the pool 1150 has the first register name and is tagged with a first context identifier tag associated with the first context. When a first register (e.g., register 1101*a*) in the pool has the first register name and is tagged with the first context identifier tag (i.e., when the context identifier tag 1102*a* matches the first identifier tag of the first context), the context control unit 1110 can provide the first context with read and write access to the first register 1101a. However, when none of the registers in the pool 1150 has the first register name and is tagged with the first context identifier tag, the context control unit 1110 can select a free register (e.g., 1101b), if present, can use the first context identifier tag to restore first context information from the context save area 1135 to the selected register 1101n, and can provide the first context with access to that free register 1101b. When none of the registers in the pool 1150 has the first register name and is tagged with the first context identifier tag and when none of the registers in the pool 1150 is free, the context control unit 1110 can select a selected register (e.g., register 1101n) from the pool and, particularly, a selected register that has a different register name and that is tagged with a different context identifier tag associated with a second context. Then, the context control unit 1110 can use the different context identifier tag to save, in the context save area 1135 of the memory 1130, any context information from the selected register 1101n. Next, the context control unit 1110 can rename the selected register 1101n with the first register name and can retag the selected register 1101n with the first context identifier tag (i.e., can change the context identifier tag 1102n from the different context identifier tag to the first context identifier tag). Then, the context control unit 1110 can use the first context identifier tag to restore first context information from the context save area 1135 to the selected register 1101n and can provide the first context with read and write access to the selected register 1101n.

Figure 12:
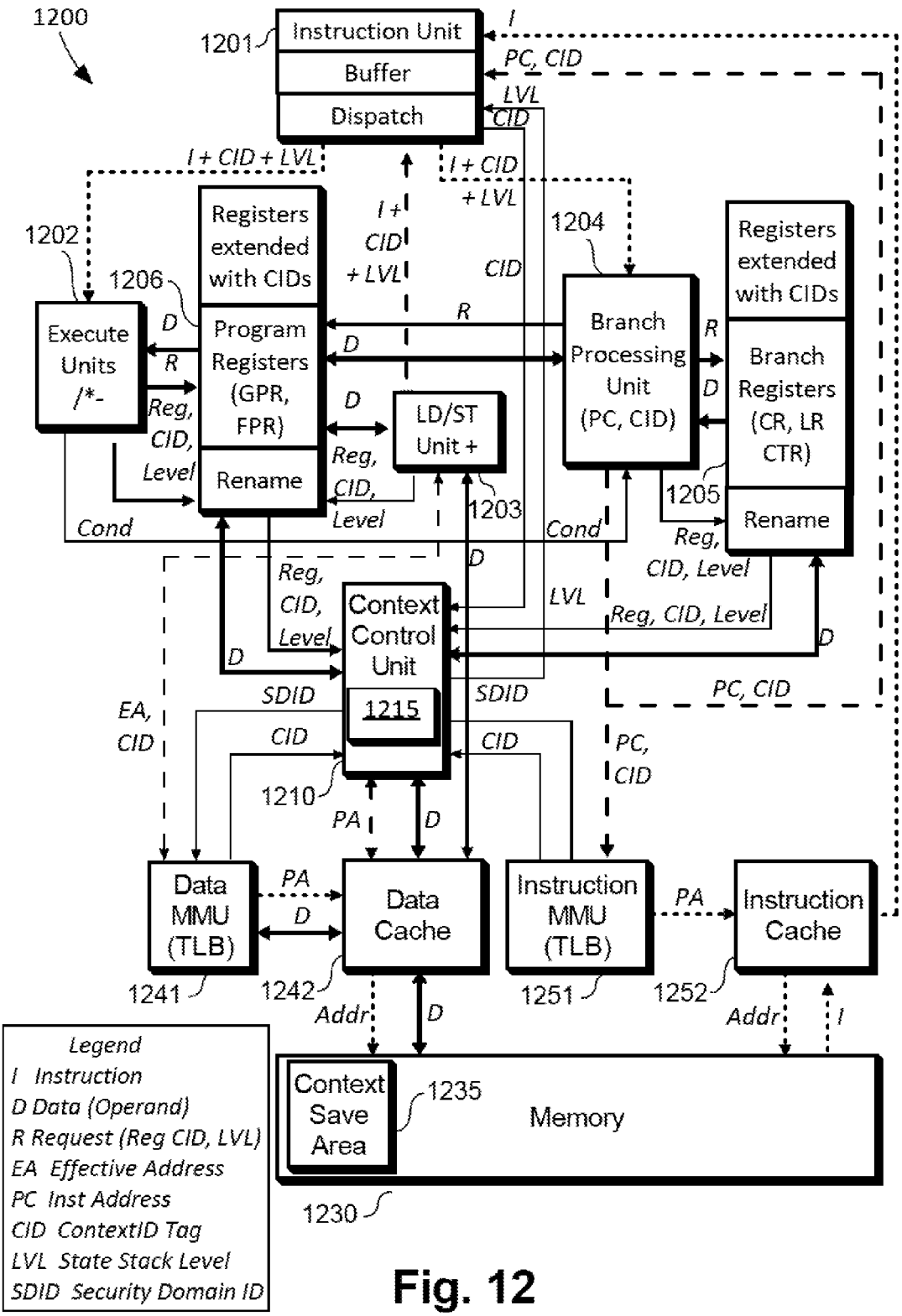
FIG. 12 is a schematic diagram illustrating a data processor incorporating aspects of the embodiment of FIG. 11, according to an aspect of the invention.

FIG. 12 is a schematic drawing illustrating the high-level architecture for a microprocessor 1200, which incorporates a context control unit 1210 similar to unit 1110, a context control table 1215 similar to context control table 1115, a memory 1230 similar to memory 1130, and a context save area 1235 similar to context save area 1135. Processor 1200 can include an instruction unit 1201, which includes an instruction buffer and dispatch and which receives, queues, and dispatches instructions; maintains registers with counter and link addresses; and condition information (CR). Instructions can be dispatched as appropriate to execution units 1202 (e.g., integer and floating point), a load/store unit 1203, and a branch processing unit 1204. Arguments and results of the instructions can be stored in the program registers 1206 (e.g., the general purpose registers (GPR), and floating point registers (FPR)). The load/store unit 1203 and the instruction unit 1201 can retrieve and store data to a main memory 1230. Addresses for the interactions can be translated from logical to physical addresses in a data memory management unit (DATA MMU) 1241 and instruction memory management unit (INST MMU) 1251 and the data itself can be cached in the respective data cache 1242 and instruction cache 1252.

The registers (e.g., the program registers 1206 and branch registers 1205) and machine state can further be extended with context identifier tags (CIDs). A security domain identifier (SDID) and a context stack level tag (LVL), if the registers 1205 and/or 1206, are stackable, can also be added. The memory 1230 can be divided into security domains. The memory 1230 can be extended with an SDID. The context control unit 1210 contains a context control table 1215 that provides the necessary mapping. The DATA MMU 1241 and the INST MMU 1251 can use the context control unit 1210 to get the SDID for a reference to confirm that the reference is legitimate. If the reference is legitimate, the DATA MMU 1251 can give the physical address to the data cache 1242 and the data can be read (data or instruction) or written (data only) based on the request.

The data processor 1200 can further include a context save area 1235 within the memory 1230. This context save area 1235 can only be addressed by the hardware of the context control unit 1210. The context control unit 1210, which is in communication with the various registers 1205, 1206, can also be in communication with rename and dispatch units. The instruction unit 1201 and, particularly, the dispatch unit of the instruction unit can use the context control unit 1210 to get the context identifier tag and, if applicable, the LVL of the context for the instructions that it is about to dispatch. Instruction unit 1202 dispatches the request to the load/store unit 1203 and the execute unit 1202, which each operate on the program registers 1206, and to the branch processing unit 1204, which operates on the branch registers 1205.

The load/store unit 1203 can receive the instruction from the dispatch unit. The load/store unit 1203 can be used for addition. When used for addition, it functions the same as the execute unit. For a load, the load/store unit 1203 receives the instruction, the name of the program register 1206 being loaded from the rename unit using the register (from the instruction), the CID, and the LVL (if applicable). It also passes the effective address and CID to the data cache 1242 so that it can retrieve the data. When the data is retrieved, it is placed in the indicated register 1206 and the load/store unit 1203 is ready for the next instruction. For a store, the load store unit 1203 retrieves the name of the program register 1206 containing the data from the rename unit. It extracts the data from that program register and passes the effective address (EA), CID, LVL (if applicable) and data to the data cache 1242 to be written. Once the data is written, the load/store unit 1203 is ready for the next instruction to store data or retrieve data.

The execute units 1202 can perform arithmetic operations on program registers 1206. An execute unit 1202 receives the names of the program registers 1206 it will operate on from the rename unit using the register name, CID, and LVL (if applicable). It then requests the contents of these program registers 1206, performs the indicated operation, and requests that the result be placed in the indicated program register.

Following processing by an execute unit 1202, any resulting condition codes can be made available to the branch processing unit 1204. The branch processing unit 1204 can receive instructions, the CID and the LVL (if applicable) from the instruction unit 1201 and, more particularly, from the dispatch unit of the instruction unit 1201. The branch processing unit 1204 can also contain the program counter and associated CID for the current context. The branch processing unit 1204 can receive the name of the branch registers 1205 it will need from a branch registers rename unit using the request, the CID, and LVL (if applicable). It can then receive the contents of the branch registers 1206 and perform the branch, as appropriate. Once done, the branch processing unit 1204 informs the instruction MMU 1251 and the instruction unit 1201 of the next instruction to be performed as well as the CID associated with that instruction. If the branch is a cross-context call, it marks the branch registers 1205 that are being passed into the new context with the CID of the new context and changes the current CID to the CID of the new context. It should be noted that, for simplicity, FIG. 12 shows two rename units. However, those skilled in the art will recognize that there could be one or more rename units in the data processor 1200, each rename unit can be adapted to provide the correct name of any register with consistency between the rename units.

It will thus be appreciated that while the non-limiting examples of FIGS. 1-3 and 6 depict the provision of first and second isolated computational entities via separate hardware, the same can also be achieved in a single processor using, for example, techniques as shown in FIGS. 9 and/or 10 and/or via the context identifier tag approach of FIGS. 11 and 12.

Thus, in some cases, the at least one user interface element includes a stateful user interface element 901, 903, 1001, 1003; the first isolated computational entity includes a first interface state storage unit 994, 1094 configured to store a first state of the at least one stateful user interface element; the second isolated computational entity includes a second interface state storage unit 992, 1092, isolated from the first interface state storage unit, and configured to store a second state of the at least one stateful user interface element; and the switching arrangement is further configured to: in the first mode, make the first state available to the at least one stateful user interface element; and in the second mode, make the second state available to the at least one stateful user interface element.

As shown in FIG. 9, in some cases, the first and second isolated computational entities are realized in a single processing unit 919 with isolated first and second register storage 998, 996.

As shown in FIG. 10, in some cases, the first and second isolated computational entities are realized in a single processing unit 1019 with isolated first and second operating systems 1086, 1084 under management of a hypervisor 1088.

As shown in FIGS. 11 and 12, in some cases the first and second isolated computational entities are realized in a single processing unit with a plurality of registers 1150 and a context control unit 1110 using context identifier tags 1102 associated with at least first and second contexts to control access by the at least first and second contexts to the plurality of registers. The first and second contexts correspond to the first and second modes.

In another aspect, an exemplary apparatus includes at least one user interface element such as 601, 603, 605, 607, 901, 903, 905, 907, 1001, 1003, 1005, 1007, or the like. The apparatus also includes at least one processor such as 619, 627, 802, 919, 1019, 1200, or the like that is coupled to the user interface element and operative in one of: (i) a first personality with first personality data and one or more first personality programs associated therewith; and (ii) a second personality with second personality data and one or more second personality programs associated therewith. Also included is a switching arrangement such as 130 or the like, associated with the at least one processor, which causes the apparatus to switch between the first personality and the second personality. When the at least one processor is operative in the first personality, a user of the apparatus is unable to use any of the user interface element(s) to observe or affect operation of the one or more second personality programs and the second personality data (second personality programs may optionally be executing on second personality data in the background). When the at least one processor is operative in the second personality, a user of the apparatus is unable to use any of the user interface element(s) to observe or affect operation of the one or more first personality programs and the first personality data (first personality programs may optionally be executing on first personality data in the background). Furthermore in this regard, in a single-processor device, one way to maintain secure isolation is to only allow one of the virtual machines managed by the hypervisor to run at a time. Alternatively, if the owner of the device or the manager of the second personality is less concerned about security, the other personality could be allowed to operate in the background until blocked by a resource owned by the first personality.

This approach can be expended to additional personalities if desired.

In another aspect, a service provider may provide components of one or more systems herein to a device manufacturer; for example, processor 104, switch 130, and I/O controller 128, configured to interface with the other components. The service provider may or may not charge the device manufacturer a fee. The service provider may charge a fee to enterprises and/or users for supporting the processor 104 and associated functionality.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
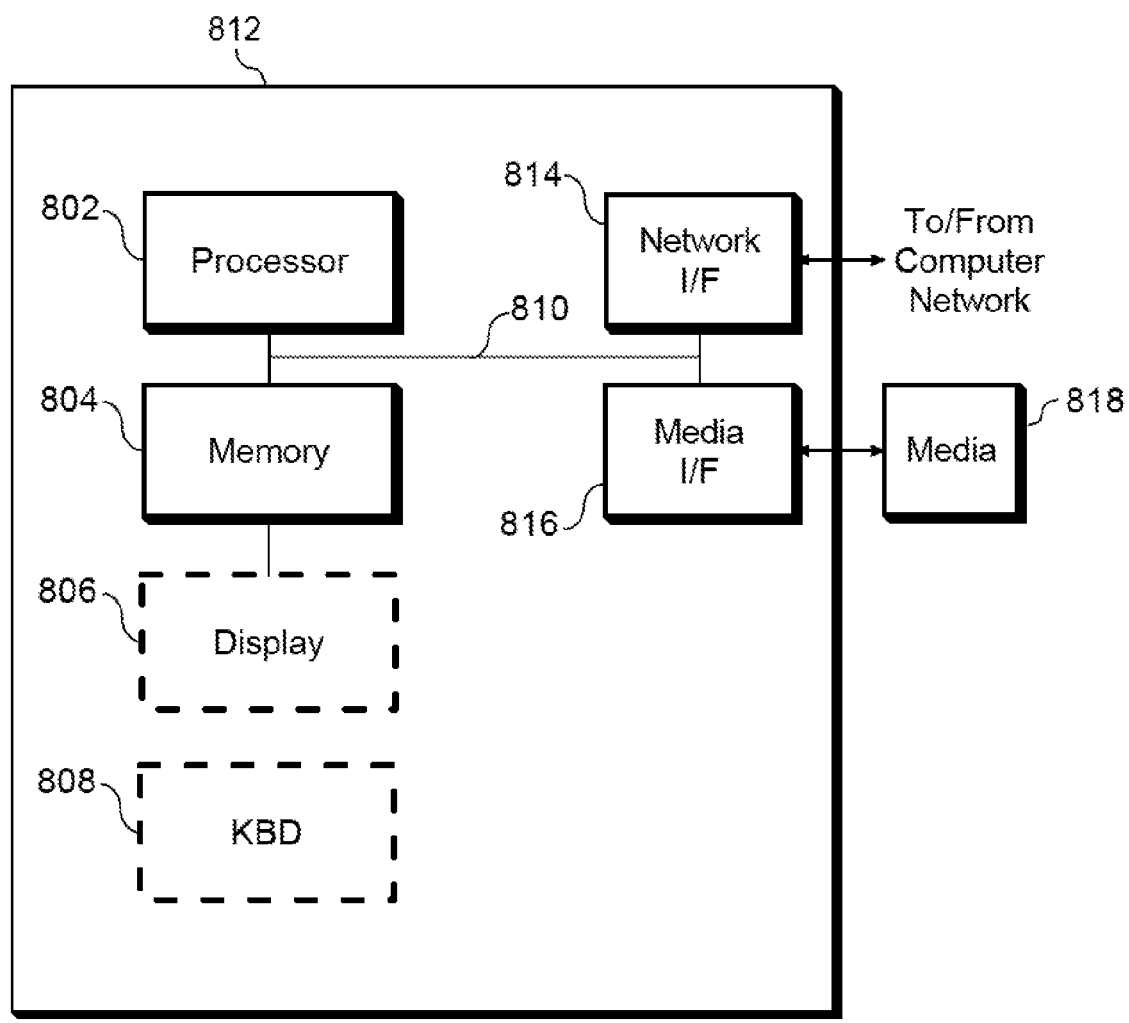
FIG. 8 depicts a computer system that may be useful in implementing one or more aspects and/or elements of the invention.

One or more embodiments can make use of software running on a mobile device such as a smart phone or tablet. With reference to FIG. 8, such an implementation might employ, for example, a processor 802, a memory 804, and an input/output interface formed, for example, by a display 806 and a keyboard 808 (possibly combined in a touch screen, e.g.). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse, touch screen), and one or more mechanisms for providing results associated with the processing unit (for example, display). The processor 802, memory 804, and input/output interface can be interconnected, for example, via bus 810 as part of a mobile device 812. Some mobile devices might include suitable interconnections, for example via bus 810, to a network interface 814, such as a network card, which can be provided to interface with a computer network, and to a media interface 816, which can be provided to interface with media 818.

Accordingly, computer software including instructions or code for performing the methodologies of some aspects of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A mobile device suitable for storing and/or executing program code will include at least one processor 802 coupled directly or indirectly to memory elements 804 through a system bus 810 or the like. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like (possibly combined in a touch screen)) can be coupled to the system either directly (such as via bus 810) or through intervening I/O controllers (omitted for clarity).

Network adapters such as network interface 814 may optionally be coupled to the device to enable the device to become coupled to other data processing systems or remote printers or storage devices through intervening private or public networks. Such connections may be wireless, for example.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the software-realizable elements depicted in the block diagrams and/or described herein; by way of example and not limitation, a first operating system module 1086, a second operating system module 1084, and a hypervisor module 1088. The method steps can then be carried out using the distinct software modules and/or submodules of the system, as described above, executing on one or more hardware processors 802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   at least one user interface element;
   a first isolated computational entity;
   a second isolated computational entity;
   a switching arrangement configured to:
      in a first mode, connect said first isolated computational entity to said at least one user interface element; and
      in a second mode, connect said second isolated computational entity to said at least one user interface element; and
   a shared housing for said at least one user interface element, said first isolated computational entity, said second isolated computational entity, and said switching arrangement;
   wherein:
      said first isolated computational entity comprises an enterprise computing system including an enterprise memory, and an enterprise system processor coupled to said enterprise memory;
      said second isolated computational entity comprises a non-enterprise computing system including a non-enterprise memory isolated from and physically separate from said enterprise memory, and a non-enterprise system processor coupled to said non-enterprise memory and isolated from said enterprise processor; and
      said enterprise memory and said enterprise system processor are used only for said enterprise computing system;
      said non-enterprise memory and said non-enterprise system processor are used only for said non-enterprise computing system.

2. A method comprising:
   providing an apparatus comprising:
      at least one user interface element;
      a first isolated computational entity;
      a second isolated computational entity;
      a switching arrangement configured to:
         in a first mode, connect said first isolated computational entity to said at least one user interface element; and
         in a second mode, connect said second isolated computational entity to said at least one user interface element; and
      a shared housing for said at least one user interface element, said first isolated computational entity, said second isolated computational entity, and said switching arrangement;
   wherein:
      said first isolated computational entity comprises an enterprise computing system including an enterprise memory, and an enterprise system processor coupled to said enterprise memory;
      said second isolated computational entity comprises a non-enterprise computing system including a non-enterprise memory isolated from and physically separate from said enterprise memory, and a non-enterprise system processor coupled to said non-enterprise memory and isolated from said enterprise processor; and
      said enterprise memory and said enterprise system processor are used only for said enterprise computing system;
      said non-enterprise memory and said non-enterprise system processor are used only for said non-enterprise computing system;
   operating said apparatus in said first mode; and
   switching said apparatus from said first mode to said second mode.

3. An apparatus comprising:
   a user interface element;
   at least one processor coupled to said user interface element and operative in one of:

a first personality with first personality data and one or more first personality programs associated therewith; and a second personality with second personality data and one or more second personality programs associated therewith; and a switching arrangement, associated with said at least one processor, which causes said apparatus to switch between said first personality and said second personality;

wherein:

when said at least one processor is operative in said first personality, a user of said apparatus is unable to observe or affect operation of said one or more second personality programs and said second personality data; and when said at least one processor is operative in said second personality, a user of said apparatus is unable to observe or affect operation of said one or more first personality programs and said first personality data.

4. A kit of parts for assembly into a mobile device having a housing, a first processor, and at least one user interface element, said kit of parts comprising:

a second processor;

an input/output controller configured to determine user intent to access one of an enterprise personality of said mobile device and a non-enterprise personality of said mobile device; and a switching arrangement configured to, responsive to said input/output controller:

in a first mode, corresponding to one of said enterprise personality and said non-enterprise personality, connect the first processor to the at least one user interface element; and in a second mode, corresponding to another one of said enterprise personality and said non-enterprise personality, connect said second processor to the at least one user interface element.

5. A method of providing a service, comprising:

providing to a mobile device manufacturer a kit of parts for assembly into a mobile device having a housing, a first processor, and at least one user interface element, said kit of parts comprising:

a second processor;

an input/output controller configured to determine user intent to access one of an enterprise personality of said mobile device and a non-enterprise personality of said mobile device; and a switching arrangement configured to, responsive to said input/output controller:

in a first mode, corresponding to one of said enterprise personality and said non-enterprise personality, connect the first processor to the at least one user interface element; and in a second mode, corresponding to another one of said enterprise personality and said non-enterprise personality, connect said second processor to the at least one user interface element; and providing support for said another one of said enterprise personality and said non-enterprise personality, once assembled into said mobile device, to a user of said mobile device.

* * * * *